United States Patent
Binette et al.

(10) Patent No.: US 9,180,346 B2
(45) Date of Patent: Nov. 10, 2015

(54) GOLF BALLS HAVING FOAM CENTER CONTAINING CLAY PARTICULATE

(71) Applicant: Acushnet Company, Fairhaven, MA (US)

(72) Inventors: Mark L. Binette, Mattapoisett, MA (US); Brian Comeau, Berkley, MA (US); Michael Michalewich, Mansfield, MA (US); Shawn Ricci, New Bedford, MA (US); Michael J. Sullivan, Old Lyme, CT (US); Douglas S. Goguen, New Bedford, MA (US)

(73) Assignee: Acushnet Company, Fairhaven, MA (US)

( * ) Notice: Subject to any disclaimer, the term of this patent is extended or adjusted under 35 U.S.C. 154(b) by 161 days.

(21) Appl. No.: 14/060,863

(22) Filed: Oct. 23, 2013

(65) Prior Publication Data

US 2015/0111666 A1    Apr. 23, 2015

(51) Int. Cl.

| A63B 37/02 | (2006.01) |
|---|---|
| A63B 37/00 | (2006.01) |
| C08L 75/04 | (2006.01) |
| C08L 75/06 | (2006.01) |
| C08L 75/08 | (2006.01) |
| C08L 75/14 | (2006.01) |

(52) U.S. Cl.
CPC ......... *A63B 37/0051* (2013.01); *A63B 37/0058* (2013.01); *A63B 37/0063* (2013.01); *A63B 37/0064* (2013.01); *A63B 37/0066* (2013.01); *C08L 75/04* (2013.01); *C08L 75/06* (2013.01); *C08L 75/08* (2013.01); *C08L 75/14* (2013.01)

(58) Field of Classification Search
CPC ......... C08L 75/04; C08L 75/06; C08L 75/08; C08L 75/14; A63B 37/0051; A63B 37/0058; A63B 37/0066
See application file for complete search history.

(56) References Cited

U.S. PATENT DOCUMENTS

| 4,836,552 | A | * | 6/1989 | Puckett et al. ............... 473/372 |
|---|---|---|---|---|
| 4,839,116 | A | | 6/1989 | Puckett et al. |
| 5,104,126 | A | | 4/1992 | Gentiluomo |

(Continued)

FOREIGN PATENT DOCUMENTS

| EP | 0154735 | 9/1985 |
|---|---|---|
| WO | 2007030719 | 3/2007 |

OTHER PUBLICATIONS

U.S. Appl. No. 13/611,376; Golf Balls Having Dual-Layered Cores Comprising Metal-containing and Thermoplastic Compositions; Inventor(s): Michael J. Sullivan and Mark L. Binette, Published Mar. 13, 2014.

(Continued)

*Primary Examiner* — John E Simms, Jr.
(74) *Attorney, Agent, or Firm* — Daniel W. Sullivan

(57) ABSTRACT

Multi-piece golf balls having a solid core made of a foamed composition and a cover are provided. Preferably, the core is dual-layered having has a foam inner core (center) and surrounding thermoset or thermoplastic outer core layer. Preferably, a polyurethane foam composition containing mineral filler particulate, for example, nanoclay particles, is used to form the foam center. The surrounding outer core layer may be made from non-foamed or foamed compositions. For example, polybutadiene rubber or highly neutralized olefin acid copolymers may be used in the outer core layer. The core layers have different hardness gradients and specific gravity values.

27 Claims, 5 Drawing Sheets

(56) References Cited

U.S. PATENT DOCUMENTS

| | | | |
|---|---|---|---|
| 5,253,871 | A | 10/1993 | Viollaz |
| 5,439,227 | A | 8/1995 | Egashira et al. |
| 5,482,285 | A | 1/1996 | Yabuki et al. |
| 5,556,098 | A | 9/1996 | Higuchi et al. |
| 5,663,111 | A | 9/1997 | Gadberry et al. |
| 5,688,192 | A | 11/1997 | Aoyama |
| 5,688,595 | A | 11/1997 | Yamagishi et al. |
| 5,725,442 | A | 3/1998 | Higuchi et al. |
| 5,739,087 | A | 4/1998 | Dennis |
| 5,780,376 | A | 7/1998 | Gonzales et al. |
| 5,823,889 | A | 10/1998 | Aoyama |
| 5,833,553 | A | 11/1998 | Sullivan et al. |
| 5,971,870 | A * | 10/1999 | Sullivan et al. ............... 473/373 |
| 6,036,765 | A | 3/2000 | Farrow et al. |
| 6,057,403 | A | 5/2000 | Sullivan et al. |
| 6,213,895 | B1 | 4/2001 | Sullivan et al. |
| 6,245,859 | B1 | 6/2001 | Sullivan et al. |
| 6,386,992 | B1 | 5/2002 | Harris et al. |
| 6,390,935 | B1 | 5/2002 | Sugimoto |
| 6,431,999 | B1 | 8/2002 | Nesbitt |
| 6,432,000 | B1 * | 8/2002 | Nesbitt et al. ............... 473/377 |
| 6,494,795 | B2 | 12/2002 | Sullivan |
| 6,518,324 | B1 * | 2/2003 | Kresta et al. .................... 521/83 |
| 6,520,872 | B2 | 2/2003 | Endo et al. |
| 6,534,570 | B2 | 3/2003 | Farrow et al. |
| 6,634,962 | B2 | 10/2003 | Sullivan |
| 6,635,108 | B1 | 10/2003 | Farrow et al. |
| 6,688,991 | B2 | 2/2004 | Sullivan et al. |
| 6,692,380 | B2 | 2/2004 | Sullivan et al. |
| 6,743,123 | B2 | 6/2004 | Sullivan |
| 6,767,294 | B2 * | 7/2004 | Nesbitt ........................ 473/369 |
| 6,787,592 | B1 | 9/2004 | Powell et al. |
| 6,794,447 | B1 | 9/2004 | Kim et al. |
| 6,846,559 | B2 | 1/2005 | Czaplicki et al. |
| 6,852,042 | B2 * | 2/2005 | Sullivan et al. ............... 473/374 |
| 6,890,502 | B2 | 5/2005 | Bauer et al. |
| 6,939,249 | B2 | 9/2005 | Sullivan |
| 6,995,191 | B2 | 2/2006 | Sullivan et al. |
| 7,147,578 | B2 | 12/2006 | Nesbitt et al. |
| 7,160,208 | B2 | 1/2007 | Watanabe |
| 7,255,656 | B2 | 8/2007 | Sullivan et al. |
| 7,261,647 | B2 | 8/2007 | Sullivan et al. |
| 7,314,896 | B2 | 1/2008 | Rajagopalan et al. |
| 7,371,192 | B2 | 5/2008 | Sullivan et al. |
| 7,452,291 | B2 | 11/2008 | Sullivan et al. |
| 7,708,654 | B2 * | 5/2010 | Sullivan et al. ............... 473/373 |
| 7,785,216 | B2 | 8/2010 | Hebert et al. |
| 7,888,419 | B2 | 2/2011 | Cooper et al. |
| 7,935,004 | B2 | 5/2011 | Dalton et al. |
| 7,988,779 | B2 | 8/2011 | Disalvo et al. |
| 8,124,678 | B2 | 2/2012 | Boscia et al. |
| 8,124,681 | B2 | 2/2012 | Sullivan et al. |
| 8,217,108 | B2 | 7/2012 | Cooper et al. |
| 8,272,971 | B2 | 9/2012 | Tutmark |
| 2005/0261084 | A1 * | 11/2005 | Sullivan et al. ............... 473/354 |
| 2007/0077321 | A1 * | 4/2007 | Veilleux et al. ............... 425/116 |
| 2007/0191526 | A1 | 8/2007 | Jordan et al. |
| 2009/0173906 | A1 | 7/2009 | Park et al. |
| 2010/0099782 | A1 | 4/2010 | Lee et al. |
| 2013/0072322 | A1 | 3/2013 | Morgan et al. |

OTHER PUBLICATIONS

U.S. Appl. No. 13/606,099; Golf Balls Having Dual-Layered Cores With Metal-containing Centers and Themorset Outer Cores; Inventor(s): Michael J. Sullivan and Mark L. Binette. Published Mar. 13, 2014.

P.K. Palani and M. Nanda Kumar, "Analysis of Mechanical Properties of Chopped Strand Mat E-Glass Fiber Epoxy Resin Nanoclay Composites," The International Journal of Engineering and Sciences, 2(2) (2013) pp. 185-189.

Ivan Javni et al., "Structure and Properties of Flexible Polyurethane Foams with Nano- and Micro-Fillers," Journal of Cellular Plastics, 47(4) (2011) pp. 357-372.

Ganiyu Kayode Latinwo et al., "Effects of Different Filler Treatments on the Morphology and Mechanical Properties of Flexible Polyurethane Foam Composites," Nature and Science, 8(6) (2010) pp. 23-31.

Tomy Widya and Christopher W. Macosko, "Nanoclay-Modified Rigid Polyurethane Foam" Journal of Macromolecular Science, Part B: Physics, 44 (2005) pp. 897-908.

\* cited by examiner

GOLF BALLS HAVING FOAM CENTER CONTAINING CLAY PARTICULATE

BACKGROUND OF THE INVENTION

1. Field of the Invention

The present invention relates generally to multi-piece, golf balls having a solid core made of a foamed composition. Particularly, the dual-layered core has a foam inner core (center) and surrounding thermoset or thermoplastic outer core layer. Preferably, a polyurethane foam composition containing mineral filler particulate, for example, nanoclay particles, is used to form the foam center. The core layers have different hardness gradients and specific gravity values. The ball further includes a cover of at least one layer.

2. Brief Review of the Related Art

Both professional and amateur golfer use multi-piece, solid golf balls today. Basically, a two-piece solid golf ball includes a solid inner core protected by an outer cover. The inner core is made of a natural or synthetic rubber such as polybutadiene, styrene butadiene, or polyisoprene. The cover surrounds the inner core and may be made of a variety of materials including ethylene acid copolymer ionomers, polyamides, polyesters, polyurethanes, and polyureas.

In recent years, three-piece, four-piece, and even five-piece balls have become more popular. New manufacturing technologies, lower material costs, and desirable ball playing performance properties have contributed to these multi-piece balls becoming more popular. Many golf balls used today have multi-layered cores comprising an inner core and at least one surrounding outer core layer. For example, the inner core may be made of a relatively soft and resilient material, while the outer core may be made of a harder and more rigid material. The "dual-core" sub-assembly is encapsulated by a cover of at least one layer to provide a final ball assembly. Different materials can be used to manufacture the core and cover and impart desirable properties to the final ball.

In general, dual-cores comprising an inner core (or center) and a surrounding outer core layer are known in the industry. For example, Sugimoto, U.S. Pat. No. 6,390,935 discloses a three-piece golf ball comprising a core having a center and outer shell and a cover disposed about the core. The specific gravity of the outer shell is greater than the specific gravity of the center. The center has a JIS-C hardness (X) at the center point thereof and a JIS-C hardness (Y) at a surface thereof satisfying the equation: $(Y-X) \geq 8$. The core structure (center and outer shell) has a JIS-C hardness (Z) at a surface of 80 or greater. The cover has a Shore D hardness of less than 60.

Endo, U.S. Pat. No. 6,520,872 discloses a three-piece golf ball comprising a center, an intermediate layer formed over the center, and a cover formed over the intermediate layer. The center is preferably made of high-cis polybutadiene rubber; and the intermediate and cover layers are preferably made of an ionomer resin such as an ethylene acid copolymer.

Watanabe, U.S. Pat. No. 7,160,208 discloses a three-piece golf ball comprising a rubber-based inner core; a rubber-based outer core layer; and a polyurethane elastomer-based cover. The inner core layer has a JIS-C hardness of 50 to 85; the outer core layer has a JIS-C hardness of 70 to 90; and the cover has a Shore D hardness of 46 to 55. Also, the inner core has a specific gravity of more than 1.0, and the core outer layer has a specific gravity equal to or greater than that of that of the inner core.

The core sub-structure located inside of the golf ball acts as an engine or spring for the ball. Thus, the composition and construction of the core is a key factor in determining the resiliency and rebounding performance of the ball. In general, the rebounding performance of the ball is determined by calculating its initial velocity after being struck by the face of the golf club and its outgoing velocity after making impact with a hard surface. More particularly, the "Coefficient of Restitution" or "COR" of a golf ball refers to the ratio of a ball's rebound velocity to its initial incoming velocity when the ball is fired out of an air cannon into a rigid vertical plate. The COR for a golf ball is written as a decimal value between zero and one. A golf ball may have different COR values at different initial velocities. The United States Golf Association (USGA) sets limits on the initial velocity of the ball so one objective of golf ball manufacturers is to maximize COR under such conditions. Balls with a higher rebound velocity have a higher COR value. Such golf balls rebound faster, retain more total energy when struck with a club, and have longer flight distance as opposed to balls with low COR values. These properties are particularly important for long distance shots. For example, balls having high resiliency and COR values tend to travel a far distance when struck by a driver club from a tee.

The durability, spin rate, and feel of the ball also are important properties. In general, the durability of the ball refers to the impact-resistance of the ball. Balls having low durability appear worn and damaged even when such balls are used only for brief time periods. In some instances, the cover may be cracked or torn. The spin rate refers to the ball's rate of rotation after it is hit by a club. Balls having a relatively high spin rate are advantageous for short distance shots made with irons and wedges. Professional and highly skilled amateur golfers can place a back spin more easily on such balls. This helps a player better control the ball and improves shot accuracy and placement. By placing the right amount of spin on the ball, the player can get the ball to stop precisely on the green or place a fade on the ball during approach shots. On the other hand, recreational players who cannot intentionally control the spin of the ball when hitting it with a club are less likely to use high spin balls. For such players, the ball can spin sideways more easily and drift far-off the course, especially if it is hooked or sliced. Meanwhile, the "feel" of the ball generally refers to the sensation that a player experiences when striking the ball with the club and it is a difficult property to quantify. Most players prefer balls having a soft feel, because the player experience a more natural and comfortable sensation when their club face makes contact with these balls. Balls having a softer feel are particularly desirable when making short shots around the green, because the player senses more with such balls. The feel of the ball primarily depends upon the hardness and compression of the ball.

Manufacturers of golf balls are constantly looking to different materials for improving the playing performance and other properties of the ball. For example, Kim et al., U.S. Pat. No. 6,794,447 discloses golf balls incorporating nanofiller material in their cores, outer cover layers, or, intermediate layers. The material includes a polymer such as polyamide, ionomer, polycarbonate, polyurethane, polystyrene, polyethylene, fluoropolymer, polyamide elastomer, thermoplastic polyolefin, polyester elastomer, polyester, polyolefin, thermoplastic elastomer, thermoplastic vulcanizate, or epoxy resin. Nano-particles of inorganic material are dispersed in the polymeric material. The particles have a size of one micron (μm) or smaller and particles preferably consist essentially of clay, such as hydrotalcite, montmorillonite, micafluoride, or octosilicate.

Jordan et al., US Patent Application Publication US 2007/0191526 discloses golf balls having a core and cover surrounding the core. At least one of the layers is formed from a composition comprising nanoclays and a fully neutralized ethylene acid copolymer or other ionomer resin. The acid groups in the ionomer resin may be neutralized by a salt of an organic acid, a cation source, or a suitable base. The nano-clays are described as being high aspect ratio additives typically based on montmorillonite clay. The nanoclays preferably have a 50% average dry particle size of 6 μm or less and a 10% average dry particle size of 2 μm or less with a preferred aspect ratio of 100 to 150.

Sullivan et al., U.S. Pat. No. 7,261,647 discloses golf balls having a core, vapor barrier layer, and cover. The barrier layer is formed from a polymer comprising a nano-materials such as smectite minerals; carbon nanotubes; fullerenes; single-wall and multi-wall carbon nanotubes; polymer nanofibers; and carbon nanofibrils with an average particle size of less than 100 nm. According to Sullivan '647, the nano-material creates a tortuous path across the barrier layer to prevent vapor from penetrating therein. Suitable polymers are described as including ionomeric copolymers and terpolymers, thermoplastic elastomers, polybutadiene rubber, balata, grafted metallocene-catalyzed polymers, polyurethanes, and polyureas.

One drawback with adding mineral fillers, particularly nanometer-sized materials ("nano-materials"), is that such fillers are often difficult to disperse in the composition. The very small size of the nano-particles makes them hard to disperse fully and uniformly. As a result, agglomerates of nano-particles may form in the polymeric matrix. If a significant amount of agglomerates and aggregates form, they may negatively affect physical properties of the composition such as compression strength, flexural modulus, tensile strength, elongation at break, and the like.

Thus, it would be desirable to have a composition containing nano-materials that are dispersed effectively throughout the composition. The nano-materials should be dispersed fully and uniformly to form a homogeneous mixture that can be molded easily into a golf ball core. In addition, the nano-materials should help enhance the physical and mechanical properties of the core. The resulting ball also should have good resiliency since this allows players to generate higher initial ball speed and make shots having greater distance. The present invention provides new foam core constructions having such properties as well as other advantageous features and benefits. The invention also encompasses golf balls containing the improved core constructions.

SUMMARY OF THE INVENTION

The present invention provides a multi-piece golf ball comprising a solid core having at least two layers and a cover having at least one layer. In one version, the dual-layered core includes: i) an inner core (center) comprising a foamed composition, wherein the inner core has a diameter in the range of about 0.100 to about 1.100 inches and a specific gravity ($SG_{inner}$), and ii) an outer core layer comprising a non-foamed thermoset or thermoplastic material, wherein the outer core layer is disposed about the inner core and has a thickness in the range of about 0.100 to about 0.750 inches and a specific gravity ($SG_{outer}$). Preferably, the $SG_{outer}$ is greater than the $SG_{inner}$.

Preferably, the inner core comprises a foam polyurethane composition comprising mineral filler particulate in an amount of about 0.1 to about 9.0% by weight based on the weight of the composition. The polyurethane foam is prepared from a mixture comprising polyisocyanate, polyol, mineral filler particulate, curing agent compounds, and blowing agent. Aromatic and aliphatic polyisocyanates may be used. The foamed polyurethane composition may be prepared by using water as a blowing agent. The water is added to the mixture in a sufficient amount to cause the mixture to foam. In one preferred version, the mineral filler particulate comprises clay particulate. For example a mixture of different clay particles, the particles having an average specific gravity in the range of about 1.30 to about 3.00 g/cc may be used. Nanoclay particulate also may be used. The nanoclay particles may have surfaces chemically-modified with a compound selected from the group consisting of ammonium compounds, protonated amines, organic phosphonium ions, and/or aminocarboxylic acid, preferable a quaternary ammonium compound.

Thermoset or thermoplastic materials are used to form the outer core layer in the present invention. Preferably, the thermoset and thermoplastic materials are non-foamed. Thus, the dual-core includes a foam inner core (center) and a surrounding non-foamed thermoset core layer. The inner core layer may have different thicknesses and specific gravities. For example, the inner core may have a diameter in the range of about 0.100 to about 0.900 inches, particularly 0.400 to 0.800 inches; and a specific gravity in the range of about 0.25 to about 1.25 g/cc, particularly 0.30 to 0.95 g/cc. For example, the outer core layer may have a thickness in the range of about 0.250 to about 0.750 inches and a specific gravity in the range of about 0.60 to about 2.90 g/cc.

The core layers may have different hardness gradients. For example, each core layer may have a positive, zero, or negative hardness gradient. In a first embodiment, the inner core has a positive hardness gradient; and the outer core layer has a positive hardness gradient. In a second embodiment, the inner core has a positive hardness gradient, and the outer core layer has zero or negative hardness gradient. In yet another version, the inner core has a zero or negative hardness gradient; and the outer core layer has a positive hardness gradient. In another alternative version, both the inner and outer core layers have zero or negative hardness gradients.

In one preferred embodiment of this invention, the core has adjoining foam layers. For example, the inner core (center) may comprise a first foamed polyurethane composition, and the outer core layer may comprise a second foamed polyurethane composition. Preferably, the inner core has a diameter in the range of about 0.100 to about 1.100 inches and a specific gravity ($SG_{inner}$); and the outer core has a thickness in the range of about 0.100 to about 0.750 inches and a specific gravity ($SG_{outer}$), wherein $SG_{outer}$ is greater than the $SG_{inner}$. As discussed above, mineral fillers, particularly nanoclay particulate, may be added to the foamed compositions.

In another embodiment, a multi-piece golf ball comprising a solid core having three layers and a cover having at least one layer is made. This ball may have different constructions. For example, in one version, the multi-layered core includes: i) an inner core (center) comprising a foamed composition, wherein the inner core has a diameter in the range of about 0.100 to about 1.100 inches and a specific gravity ($SG_{inner}$) an intermediate layer comprising a non-foamed thermoset or thermoplastic material, wherein the intermediate layer is disposed about the inner core and has a thickness in the range of about 0.050 to about 0.400 inches and a specific gravity ($SG_{intermediate}$); and iii) an outer core layer comprising a thermoset material, wherein the outer cover layer is disposed about the intermediate core layer and has a thickness in the range of about 0.200 to about 0.750 inches and a specific gravity ($SG_{outer}$). Preferably, the $SG_{inner}$ is less than the $SG_{intermediate}$ and $SG_{outer}$. That is, the $SG_{outer}$ is greater than the $SG_{inner}$ and the $SG_{intermediate}$ is greater than the $SG_{inner}$. In another version, the outer core layer is made of a thermoplastic composition.

BRIEF DESCRIPTION OF THE DRAWINGS

The novel features that are characteristic of the present invention are set forth in the appended claims. However, the preferred embodiments of the invention, together with further objects and attendant advantages, are best understood by reference to the following detailed description in connection with the accompanying drawings in which:

DETAILED DESCRIPTION OF THE INVENTION

Golf Ball Constructions

Golf balls having various constructions may be made in accordance with this invention. For example, golf balls having three piece, four-piece, and five-piece constructions with single or multi-layered cover materials may be made. Representative illustrations of such golf ball constructions are provided and discussed further below. The term, "layer" as used herein means generally any spherical portion of the golf ball. More particularly, in one version, a three-piece golf ball containing a dual-layered core and single-layered cover is made. The dual-core includes an inner core (center) and surrounding outer core layer. In another version, a four-piece golf ball containing a dual-core and dual-cover (inner cover and outer cover layers) is made. In yet another construction, a four-piece or five-piece golf ball containing a dual-core; casing layer(s); and cover layer(s) may be made. As used herein, the term, "casing layer" means a layer of the ball disposed between the multi-layered core sub-assembly and cover. The casing layer also may be referred to as a mantle or intermediate layer. The diameter and thickness of the different layers along with properties such as hardness and compression may vary depending upon the construction and desired playing performance properties of the golf ball.

Inner Core Composition

In general, foam compositions are made by forming gas bubbles in a polymer mixture using a foaming (blowing) agent. As the bubbles form, the mixture expands and forms a foam composition that can be molded into an end-use product having either an open or closed cellular structure. Flexible foams generally have an open cell structure, where the cells walls are incomplete and contain small holes through which liquid and air can permeate. Such flexible foams are used for automobile seats, cushioning, mattresses, and the like. Rigid foams generally have a closed cell structure, where the cell walls are continuous and complete, and are used for used for automobile panels and parts, building insulation and the like.

Figure 1:
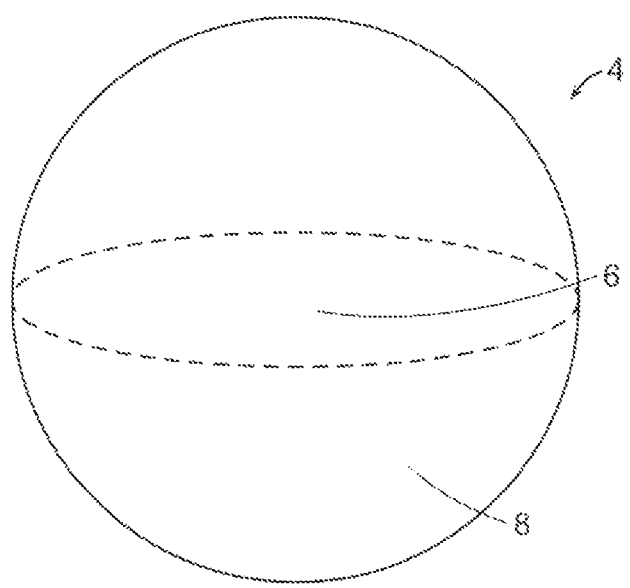
FIG. 1 is a perspective view of a spherical inner core made of a foamed composition in accordance with the present invention.

In the present invention, the inner core (center) comprises a lightweight foam thermoplastic or thermoset polymer composition that may range from relatively rigid foam to very flexible foam. Referring to FIG. 1, a foamed inner core (4) having a geometric center (6) and outer skin (8) may be prepared in accordance with this invention.

A wide variety of thermoplastic and thermoset materials may be used in forming the foam composition of this invention including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having good playing performance properties as discussed further below. By the term, "hybrids of polyurethane and polyurea," it is meant to include copolymers and blends thereof.

Basically, polyurethane compositions contain urethane linkages formed by the reaction of a multi-functional isocyanate containing two or more NCO groups with a polyol having two or more hydroxyl groups (OH—OH) sometimes in the presence of a catalyst and other additives. Generally, polyurethanes can be produced in a single-step reaction (one-shot) or in a two-step reaction via a prepolymer or quasi-prepolymer. In the one-shot method, all of the components are combined at once, that is, all of the raw ingredients are added to a reaction vessel, and the reaction is allowed to take place. In the prepolymer method, an excess of polyisocyanate is first reacted with some amount of a polyol to form the prepolymer which contains reactive NCO groups. This prepolymer is then reacted again with a chain extender or curing agent polyol to form the final polyurethane. Polyurea compositions, which are distinct from the above-described polyurethanes, also can be formed. In general, polyurea compositions contain urea linkages formed by reacting an isocyanate group (—N=C=O) with an amine group (NH or $NH_2$). Polyureas can be produced in similar fashion to polyurethanes by either a one shot or prepolymer method. In forming a polyurea polymer, the polyol would be substituted with a suitable polyamine. Hybrid compositions containing urethane and urea linkages also may be produced. For example, when polyurethane prepolymer is reacted with amine-terminated curing agents during the chain-extending step, any excess isocyanate groups in the prepolymer will react with the amine groups in the curing agent. The resulting polyurethane-urea composition contains urethane and urea linkages and may be referred to as a hybrid. In another example, a hybrid composition may be produced when a polyurea prepolymer is reacted with a hydroxyl-terminated curing agent. A wide variety of isocyanates, polyols, polyamines, and curing agents can be used to form the polyurethane and polyurea compositions as discussed further below.

To prepare the foamed polyurethane, polyurea, or other polymer composition, a foaming agent is introduced into the polymer formulation. In general, there are two types of foaming agents: physical foaming agents and chemical foaming agents.

Physical Foaming Agents. These foaming agents typically are gasses that are introduced under high pressure directly into the polymer composition. Chlorofluorocarbons (CFCs) and partially halogenated chlorofluorocarbons are effective, but these compounds are banned in many countries because of their environmental side effects. Alternatively, aliphatic and cyclic hydrocarbon gasses such as isobutene and pentane may be used. Inert gasses, such as carbon dioxide and nitrogen, also are suitable. With physical foaming agents, the isocyanate and polyol compounds react to form polyurethane linkages and the reaction generates heat. Foam cells are generated and as the foaming agent vaporizes, the gas becomes trapped in the cells of the foam.

Chemical Foaming Agents. These foaming agents typically are in the form of powder, pellets, or liquids and they are added to the composition, where they decompose or react during heating and generate gaseous by-products (for example, nitrogen or carbon dioxide). The gas is dispersed and trapped throughout the composition and foams it. For example, water may be used as the foaming agent. Air bubbles are introduced into the mixture of the isocyanate and polyol compounds and water by high-speed mixing equipment. As discussed in more detail further below, the isocyanates react with the water to generate carbon dioxide which fills and expands the cells created during the mixing process.

Preferably, a chemical foaming agent is used to prepare the foam compositions of this invention. Chemical blowing agents may be inorganic, such as ammonium carbonate and carbonates of alkalai metals, or may be organic, such as azo and diazo compounds, such as nitrogen-based azo compounds. Suitable azo compounds include, but are not limited to, 2,2'-azobis(2-cyanobutane), 2,2'-azobis(methylbutyronitrile), azodicarbonamide, p,p'-oxybis(benzene sulfonyl hydrazide), p-toluene sulfonyl semicarbazide, p-toluene sulfonyl hydrazide. Other foaming agents include any of the Celogens® sold by Crompton Chemical Corporation, and nitroso compounds, sulfonylhydrazides, azides of organic acids and their analogs, triazines, tri- and tetrazole derivatives, sulfonyl semicarbazides, urea derivatives, guanidine derivatives, and esters such as alkoxyboroxines. Also, foaming agents that liberate gasses as a result of chemical interaction between components such as mixtures of acids and metals, mixtures of organic acids and inorganic carbonates, mixtures of nitriles and ammonium salts, and the hydrolytic decomposition of urea may be used. Water is a preferred foaming agent. When added to the polyurethane formulation, water will react with the isocyanate groups and form carbamic acid intermediates. The carbamic acids readily decarboxylate to form an amine and carbon dioxide. The newly formed amine can then further react with other isocyanate groups to form urea linkages and the carbon dioxide forms the bubbles to produce the foam.

During the decomposition reaction of certain chemical foaming agents, more heat and energy is released than is needed for the reaction. Once the decomposition has started, it continues for a relatively long time period. If these foaming agents are used, longer cooling periods are generally required. Hydrazide and azo-based compounds often are used as exothermic foaming agents. On the other hand, endothermic foaming agents need energy for decomposition. Thus, the release of the gasses quickly stops after the supply of heat to the composition has been terminated. If the composition is produced using these foaming agents, shorter cooling periods are needed. Bicarbonate and citric acid-based foaming agents can be used as exothermic foaming agents.

Other suitable foaming agents include expandable gas-containing microspheres. Exemplary microspheres consist of an acrylonitrile polymer shell encapsulating a volatile gas, such as isopentane gas. This gas is contained within the sphere as a blowing agent. In their unexpanded state, the diameter of these hollow spheres range from 10 to 17 μm and have a true density of 1000 to 1300 $kg/m^3$. When heated, the gas inside the shell increases its pressure and the thermoplastic shell softens, resulting in a dramatic increase of the volume of the microspheres. Fully expanded, the volume of the microspheres will increase more than 40 times (typical diameter values would be an increase from 10 to 40 μm), resulting in a true density below 30 $kg/m^3$ (0.25 lbs/gallon). Typical expansion temperatures range from 80-190° C. (176-374° F.). Such expandable microspheres are commercially available as Expancel® from Expancel of Sweden or Akzo Nobel.

As an alternative to chemical and physical foaming agents or in addition to such foaming agents, as described above, other types of fillers that lower the specific gravity of the composition can be used in accordance with this invention. For example, polymeric, ceramic, and glass unfilled microspheres having a density of 0.1 to 1.0 g/cc and an average particle size of 10 to 250 microns can be used to help lower specific gravity of the composition and achieve the desired density and physical properties.

Additionally, BASF polyurethane materials sold under the trade name Cellasto® and Elastocell®, microcellular polyurethanes, Elastopor® H that is a closed-cell polyurethane rigid foam, Elastoflex® W flexible foam systems, Elastoflex®E semiflexible foam systems, Elastofoam® flexible integrally-skinning systems, Elastolit®D/K/R integral rigid foams, Elastopan®S, Elastollan® thermoplastic polyurethane elastomers (TPUs), and the like may be used in accordance with the present invention. Bayer also produces a variety of materials sold as Texin® TPUs, Baytec® and Vulkollan® elastomers, Baymer® rigid foams, Baydur® integral skinning foams, Bayfit® flexible foams available as castable, RIM grades, sprayable, and the like that may be used. Additional foam materials that may be used herein include polyisocyanurate foams and a variety of "thermoplastic" foams, which may be cross-linked to varying extents using free-radical (for example, peroxide) or radiation cross-linking (for example, UV, IR, Gamma, EB irradiation). Also, foams may be prepared from polybutadiene, polystyrene, polyolefin (including metallocene and other single site catalyzed polymers), ethylene vinyl acetate (EVA), acrylate copolymers, such as EMA, EBA, Nucrel®-type acid co and terpolymers, ethylene propylene rubber (such as EPR, EPDM, and any ethylene copolymers), styrene-butadiene, and SEBS (any Kraton-type), PVC, PVDC, CPE (chlorinated polyethylene). Epoxy foams, urea-formaldehyde foams, latex foams and sponge, silicone foams, fluoropolymer foams and syntactic foams (hollow sphere filled) also may be used.

In addition to the polymer and foaming agent, the foam composition also may include other ingredients such as, for example, cross-linking agents, chain extenders, surfactants, dyes and pigments, coloring agents, fluorescent agents, adsorbents, stabilizers, softening agents, impact modifiers, antioxidants, antiozonants, and the like. The formulations used to prepare the polyurethane foam compositions of this invention preferably contain a polyol, polyisocyanate, water, an amine or hydroxyl curing agent, surfactant, and a catalyst as described further below.

In one preferred version, the foam composition contains mineral filler particulate. Suitable mineral filler particulates include compounds such as zinc oxide, limestone, silica, mica, barytes, lithopone, zinc sulfide, talc, calcium carbonate, magnesium carbonate, clays, powdered metals and alloys such as bismuth, brass, bronze, cobalt, copper, iron, nickel, tungsten, aluminum, tin, precipitated hydrated silica, fumed silica, mica, calcium metasilicate, barium sulfate, zinc sulfide, lithopone, silicates, silicon carbide, diatomaceous earth, carbonates such as calcium or magnesium or barium carbonate, sulfates such as calcium or magnesium or barium sulfate. As discussed further below, the mineral fillers tend to help decrease the size of the foam cells and increase cell density. The fillers also tend to help improve the physical properties of the foam such as hardness, compression set, and tensile strength.

The preferred mineral fillers include clays, organoclays, organically-modified clays, and nanoclays. By the term, "clay" it is meant many combinations of minerals with traces of metal oxides and organic matter. Geologic clay deposits are formed from the decomposition and weathering of rock and are mostly composed of phyllosilicate minerals containing variable amounts of water trapped in the mineral structure. These include the layered silicates; metal oxides; hydroxides; and oxy-oxides. Silicate clays are commonly grouped into either kaolinite, montmorillonite-smectite, illite and chlorite, or vermiculite families. Sesquioxide clays (metal oxides and hydrous oxides), allophanes and imogolite, carbonate and sulfate minerals, are all examples of mineral filler particulates. Kaolin clays include water washed clays, surface-treated water-washed clays, delaminated clays and calcined clays. The preferred layered materials include smectite clay minerals such as montmorillonite, sodium montmorillonite; magnesium montmorillonite; and/or calcium montmorillonite nontronite, beidellite, volkonskoite, hectorite, saponite, sauconite, sobockite, stevensite, and svinfordite. Clay minerals are generally hydrated aluminum silicate minerals and comprise tetrahedral silicate sheets and octahedral hydroxide sheets. In general, the clays can be classified as 1:1 or 2:1 layered minerals. A 1:1 clay would contain one tetrahedral sheet and one octahedral sheet. Examples of such 1:1 clays include kaolinite and serpentine. A 2:1 layered clay contains an octahedral sheet sandwiched between two tetrahedral sheets, and examples are talc, vermiculite, and montmorillonite.

Such clay and other mineral fillers are described in the patent literatures, for example, Gadberry et al., U.S. Pat. No. 5,663,111; Dennis, U.S. Pat. No. 5,739,087; Gonzales et al., U.S. Pat. No. 5,780,376; Farrow et al., U.S. Pat. Nos. 6,036, 765 and 6,534,570 and 6,635,108; Powell et al., U.S. Pat. No. 6,787,592; and Bauer et al., U.S. Pat. No. 6,890,502, the disclosures of which are hereby incorporated by reference. The surfaces of the mineral filler particulate may be chemically-modified to make the particulate compatible with a polymer matrix. This surface-treatment helps improve the blending and dispersion of the particulate in the polymer matrix as described further below. Suitable mineral filler particulate that may be used in the foam formulations include, but is not limited to, Garamite® mixed mineral thixotropes, commercially available from Southern Clay Products, Inc. It is believed the Garamite® mixed mineral thixotropes is a clay material comprising a mixture of different clay materials, particularly saponite clay materials which belong to the smectite family as described above and sepiolite clay, which is a hydrous magnesium silicate clay. Unlike many clays which are layered phyliosilicates as described above, sepiolite clay miner comprises tiny elongated, needle-like particles. The tiny elongated particles of sepiolite have an average length of 1 µm to 2 µm, a width of 0.01 µm; and contain open channels with dimensions of 3.6 Å×10.6 Å running along the axis of the particle.

The mineral filler included in the foam-forming mixture of the present invention is generally included in an amount of about 0.1 to about 60% by weight, preferably about 0.1% to about 9% by weight, and more preferably about 1% to about 5% by weight, based on total weight of the foam composition. In some embodiments, the composition may contain a substantial amount of filler, for example, greater than about 25% and even greater than about 50% by weight. More particularly, the mineral filler may be present in an amount of about 50 to about 60% by weight. In general, the mineral filler has an average particle size in the range of about 1 to about 25 microns, preferably about 1 to about 5 microns; however, particles having sub-micron particle sizes may be used in accordance with this invention as described further below. For example, nanometer-sized particles having a particle size of 1 to 100 nanometers (.001 to 0.1 microns) may be used. The mineral filler particles, particularly the nanoclay particles, preferably have an average specific gravity within the range of about 1.3 to about 3.0 g/cc, more preferably in the range of about 1.4 to about 2.8 g/cc, particularly about 1.5 to about 2.0 g/cc.

It is generally known to use mineral fillers as reinforcing agents in polymer resins. However, polyurethane foam compositions are unique materials. As discussed above, the foam-forming mixture contains various reactants including polyisocyanates, polyols, curing agents, surfactants, and catalysts. Special care should be taken when adding mineral fillers to a polyurethane foam-forming mixture, because the fillers can significantly affect the foam cells being generated, for example, cell growth and cell morphology. The fillers also can affect physical properties of the foam. As discussed above, various mineral particles may be used in accordance with this invention. However, in a preferred version, nanoclay particles are included in the foam composition.

In general, nanoclays refer to clays from the smectite family having a sheet-like or platey structure with at least one dimension in the nanometer range. The smectite family includes, for example, montmorillonite, hectorite, saponite, and beidellite clays. For example, montmorillonite-based nanoclays are 2-to-1 layered minerals from the smectite clay family. Each layer has two silica tetradedral sheets containing an octahedral sheet of aluminum hydroxide between them. The discrete montmorillonite particles generally have a platelet shape and a sheet-like structure with dimensions in two directions that far exceed the particle's thickness. Particularly, the particles have a thickness of just one nanometer, but their surface dimensions are generally 300 to 600 nanometers resulting in particles having a very high aspect ratio. For example, the aspect ratio (length over width) can fall within the range of 200 to 1000 with many particles in the range of 200 to 400. Because of their high aspect ratios and high surface areas, the nanolcay particles clay can help impart various physical and chemical properties to the foam composition. In the clay's natural form, the clay particles are attracted to each other by naturally-occurring ions on their surfaces. Such non-modified clay particles tend to be organophobic and form agglomerates when they are introduced into a polymer matrix.

Thus, the surfaces of the nanoclay particles are normally chemically-modified to make them compatible with a polymer matrix. During chemical surface-treatment, the naturally-occurring cations found on the particles' surfaces are replaced with organocations. Different surface-modifying chemistries may be used. Compounds suitable for modifying the surfaces of the clay particles are known in the nanoclay industry. In particular, quaternary onium compounds may be used, preferably quaternary ammonium compounds. Suitable compounds also encompass protonated amines, organic phosphonium ions, and/or aminocarboxylic acids. For example, the surfaces may be modified with primary amines, methacryloyloxyethylhexadecyl-dimethyl ammoniums, or methyl tallow bis-2-hydroxyethyl quaternary ammonia salts. This treatment makes the particles organophillic—the particles become more attracted to and can be dispersed fully in the polymer matrix.

As the organic chemical enters the clay structure and bonds to the surfaces of the clay particles, a clay-chemical complex is formed. This step is commonly referred to as intercalation. The spacing between the particles (platelets) of the clay is increased during the intercalation step, but there is still a defined spatial relationship between the particles. This "gallery space" (inter-layer spacing) may vary depending upon the type of molecules and chemical surface-treatment applied. In the next step, the clay particles are exfoliated. That is, the clay particles are completely separated from each other—this separation enables the particles to become fully dispersed in the polymer matrix.

Suitable nanoclay particulate that may be used in the foam formulations include, but are not limited to, Cloisite® and Nanofil® commercially available from Southern Clay Products, Inc.; and Nanomax® and Nanomer® nanoclays, commercially available from Nanocor, Inc. Preferably, the foam composition contains about 0.1 to about 9.0%, preferably 0.25 to about 5%, and more preferably about 0.35 to about 1.00% by weight of nanoclay particles based on total weight of the composition.

As discussed above, polyurethanes can generally be produced in a single-step reaction (one-shot) or in a two-step reaction via a prepolymer or quasi-prepolymer step. In the one-shot method, all of the components (polyol, polyisocyanate, blowing agents such as water), an amine and/or hydroxyl curing agent, surfactant, and catalyst are combined at once. Thus, all of the raw ingredients are added to a reaction vessel, and the reaction is allowed to take place. In this one-shot reaction method, the nanoclay particulate or other mineral filler may be added to the polymeric adduct of the polyol or polyisocyanate prior to the reaction. Using this procedure, the nanoclay particles are pre-dispersed in the polyol or polyisocyanate, where their functional groups (for example, isocyanate or hydroxyl groups) may react with the chemically-modified surface of the nanoclay particles (for example, quartenary ammonia salts). Also, as discussed above, when water is added to the reaction mixture, the water will react with the isocyanate groups and form carbamic acid intermediates, and the carbamic acids decompose to form amines. The quartenary ammonia salts or other chemically reactive groups on the surface of the nanoclay particles may react with these free amine groups. This can change the reaction rate of the reactants in the mixture. On the other hand, in the prepolymer method, an excess of polyisocyanate is first reacted with some amount of a polyol to form the prepolymer which contains reactive NCO groups. This prepolymer is then reacted again with a chain extender (curing agent) to form the polyurethane. Here, the nanoclay particulate is pre-dispersed in the chain extender (curing agent) and then this mixture is reacted with the prepolymer. In the present invention, it is preferred the prepolymer method be used, wherein a pre-mixture of nanoclay/chain extender is prepared and then mixed and reacted with the prepolymer. Using this prepolymer method, the pre-mixture of nanoclay/chain extender is homogeneously mixed with the prepolymer composition and the nanoclay particles are effectively dispersed. The reaction between the chemically-modified nanoclay particle surfaces and functional groups of the other ingredients are minimized. The nanoclay particulate is dispersed uniformly in the composition and the tendency of the particles to stick together and form aggregates is minimized.

Because the nanometer-sized clay particles have a very high aspect ratio and are close in scale to the molecules of the polymer resin, they can closely interact with the resin and create constrained regions within the resin. In turn, the mechanical properties of the foam are improved. The nanoclay particles help improve compressive strength, impact strength, modulus, and other physical properties of the foams. The nanoclay particles also help create an effective gas vapor barrier. For example, the small and flexible nanoclay particles are dispersed throughout the polymer matrix and form a tortuous pathway to prevent gas from diffusing out of the foam material While not wishing to be bound by any theory, it is believed that adding the nanoclay particles to the foam composition helps improve the foam cell structure and morphology due to the interaction of the nanoclay and reactants in the foam mixture. As the nanoclay particles are introduced and dispersed in the foam mixture, they help create a greater number of smaller sized foam cells. The generated foam cells are packed together more tightly and cell density is increased. Also, the dimensions and geometry of the foam cells tends to be more uniform. The cell structure in the foam is maintained as the nanoclay particles help prevent gas from diffusing out through the cell walls. The resulting foam material tends to have greater compression strength and modulus. Also, the polyurethane foam containing the nanoclay particles tends to have faster cream time. That is, the foam rises quickly, particularly there is relatively short time period from the point of mixing the raw ingredients together to the point where the mixture turns cloudy in appearance or changes color and begins to rise from its initial stable state.

As discussed further below, in one preferred embodiment, the specific gravity (density) of the foam inner core is less than the specific gravity of the outer core. In this embodiment, it is important that a sufficient amount of nanoclay particles be added to the composition to improve cell structure and morphology. However, an excess amount of nanoclay particles should not be added to increase the specific gravity (density) of the foam inner core to a level such that it would be greater than the specific gravity of the outer core layer. If the ball's mass is concentrated towards the outer surface (for example, outer core layers), and the outer core layer has a higher specific gravity than the inner core, the ball has a relatively high Moment of Inertia (MOI). In such balls, most of the mass is located away from the ball's axis of rotation and thus more force is needed to generate spin. These balls have a generally low spin rate as the ball leaves the club's face after contact between the ball and club. Such core structures (wherein the specific gravity of the outer core is greater than the specific gravity of the inner core) is preferred in the present invention. Thus, in one preferred embodiment, the concentration of mineral filler particulate is in the range of about 0.1 to about 9.0% by weight.

It is also recognized that other nano-sized materials may be added to the foam formulation in accordance with this invention. For example, nano-sized particles may be added as described in Sullivan et al., U.S. Pat. No. 7,261,647, Rajagopalan et al., U.S. Pat. No. 7,314,896, and Sullivan et al., U.S. Pat. No. 8,124,681, the disclosures of which are hereby incorporated by reference. Other nano-materials include substantially oriented nanostructures as disclosed in Morgan et al., US Patent Application Publication 2013/0072322, the disclosure of which is hereby incorporated by reference. These nanostructures include various spherical, ovoid, elongated or branched structures, including, but not limited to, nanocrystals, nanowires, nanofibers, nanorods, nanotubes, branched nanowires, nanotetrapods, nanotripods, nanobipods, nanodots, quantum dots, nanoparticles, nanoribbons, and the like.

Properties of Polyurethane Foams

The polyurethane foam compositions of this invention have numerous chemical and physical properties making them suitable for core assemblies in golf balls. For example, there are properties relating to the reaction of the isocyanate and polyol components and blowing agent, particularly "cream time," "gel time," "rise time," "tack-free time," and "free-rise density." In general, cream time refers to the time period from the point of mixing the raw ingredients together to the point where the mixture turns cloudy in appearance or changes color and begins to rise from its initial stable state. Normally, the cream time of the foam compositions of this invention is within the range of about 20 to about 240 seconds. In general, gel time refers to the time period from the point of mixing the raw ingredients together to the point where the expanded foam starts polymerizing/gelling. Rise time generally refers to the time period from the point of mixing the raw ingredients together to the point where the reacted foam has reached its largest volume or maximum height. The rise time of the foam compositions of this invention typically is in the range of about 60 to about 360 seconds. Tack-free time generally refers to the time it takes for the reacted foam to lose its tackiness, and the foam compositions of this invention normally have a tack-free time of about 60 to about 3600 seconds. Free-rise density refers to the density of the resulting foam when it is allowed to rise unrestricted without a cover or top being placed on the mold.

The density of the foam is an important property and is defines as the weight per unit volume (typically, g/cm$^3$) and can be measured per ASTM D-1622. The hardness, stiffness, and load-bearing capacity of the foam are independent of the foam's density, although foams having a high density typically have high hardness and stiffness. Normally, foams having higher densities have higher compression strength. Surprisingly, the foam compositions used to produce the inner core of the golf balls per this invention have a relatively low density; however, the foams are not necessarily soft and flexible, rather, they may be relatively firm, rigid, or semi-rigid depending upon the desired golf ball properties. Tensile strength, tear-resistance, and elongation generally refer to the foam's ability to resist breaking or tearing, and these properties can be measured per ASTM D-1623. The durability of foams is important, because introducing fillers and other additives into the foam composition can increase the tendency of the foam to break or tear apart. In general, the tensile strength of the foam compositions of this invention is in the range of about 20 to about 1000 psi (parallel to the foam rise) and about 50 to about 1000 psi (perpendicular to the foam rise) as measured per ASTM D-1623 at 23° C. and 50% relative humidity (RH). Meanwhile, the flex modulus of the foams of this invention is generally in the range of about 5 to about 45 kPa as measured per ASTM D-790, and the foams generally have a compressive modulus of 200 to 50,000 psi.

In another test, compression strength is measured on an Instron machine according to ASTM D-1621. The foam is cut into blocks and the compression strength is measured as the force required to compress the block by 10%. In general, the compressive strength of the foam compositions of this invention is in the range of about 100 to about 1800 psi (parallel and perpendicular to the foam rise) as measured per ASTM D-1621 at 23° C. and 50% relative humidity (RH). The test is conducted perpendicular to the rise of the foam or parallel to the rise of the foam. The Percentage (%) of Compression Set also can be used. This is a measure of the permanent deformation of a foam sample after it has been compressed between two metal plates under controlled time and temperature condition (standard—22 hours at 70° C. (158° F.)). The foam is compressed to a thickness given as a percentage of its original thickness that remained "set." Preferably, the Compression Set of the foam is less than ten percent (10%), that is, the foam recovers to a point of 90% or greater of its original thickness.

Methods of Preparing the Foam Composition

The foam compositions of this invention may be prepared using different methods. In one preferred embodiment, the method involves preparing a castable composition comprising a reactive mixture of a polyisocyanate, polyol, water, curing agent, surfactant, and catalyst. A motorized mixer can be used to mix the starting ingredients together and form a reactive liquid mixture. Alternatively, the ingredients can be manually mixed together. An exothermic reaction occurs when the ingredients are mixed together and this continues as the reactive mixture is dispensed into the mold cavities (otherwise referred to as half-molds or mold cups). The mold cavities may be referred to as first and second, or upper and lower, mold cavities. The mold cavities preferably are made of metal such as, for example, brass or silicon bronze.

Figure 2:
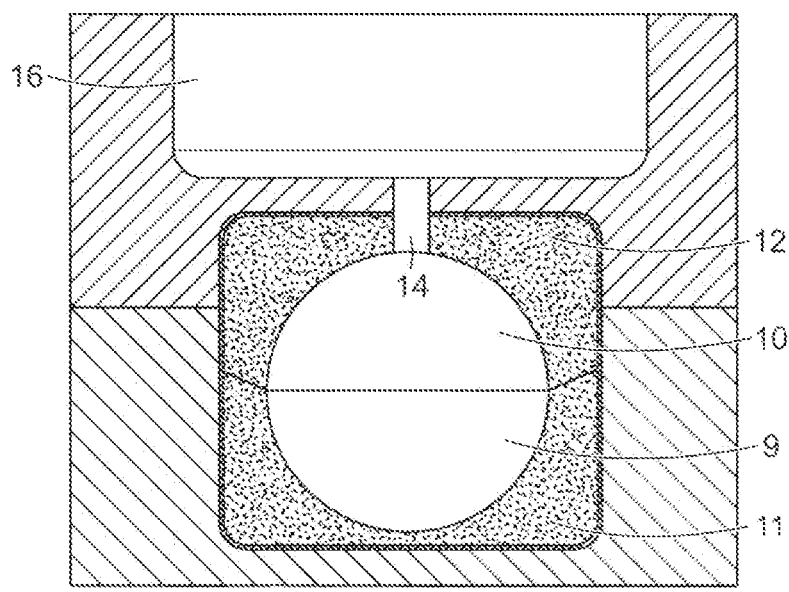
FIG. 2 is a perspective view of one embodiment of upper and lower mold cavities used to make the dual-layered cores of the present invention.

Referring to FIG. 2, the mold cavities are generally indicated at (9) and (10). The lower and upper mold cavities (9, 10) are placed in lower and upper mold frame plates (11, 12). The frame plates (11, 12) contain guide pins and complementary alignment holes (not shown in drawing). The guide pins are inserted into the alignment holes to secure the lower plate (11) to the upper plate (12). The lower and upper mold cavities (9, 10) are mated together as the frame plates (11, 12) are fastened. When the lower and upper mold cavities (9, 10) are joined together, they define an interior spherical cavity that houses the spherical core. The upper mold contains a vent or hole (14) to allow for the expanding foam to fill the cavities uniformly. A secondary overflow chamber (16), which is located above the vent (14), can be used to adjust the amount of foam overflow and thus adjust the density of the core structure being molded in the cavities. As the lower and upper mold cavities (9, 10) are mated together and sufficient heat and pressure is applied, the foamed composition cures and solidifies to form a relatively rigid and lightweight spherical core. The resulting cores are cooled and then removed from the mold.

Hardness of the Inner Core

As shown in FIG. 1, a foamed inner core (4) having a geometric center (6) and outer skin (8) may be prepared per the molding method discussed above. The outer skin (8) is generally a non-foamed region that forms the outer surface of the core structure. The resulting inner core preferably has a diameter within a range of about 0.100 to about 1.100 inches. For example, the inner core may have a diameter within a range of about 0.250 to about 1.000 inches. In another example, the inner core may have a diameter within a range of about 0.300 to about 0.800 inches. More particularly, the inner core preferably has a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. The outer skin (8) of the inner core is relatively thin preferably having a thickness of less than about 0.020 inches and more preferably less than 0.010 inches. In one preferred embodiment, the foamed core has a "positive" hardness gradient (that is, the outer skin of the inner core is harder than its geometric center.)

For example, the geometric center hardness of the inner core ($H_{inner\ core\ center}$), as measured in Shore C units, is about 10 Shore C or greater and preferably has a lower limit of about 10 or 16 or 20 or 25 or 30 or 32 or 34 or 36 or 40 Shore C and an upper limit of about 42 or 44 or 48 or 50 or 52 or 56 or 60 or 62 or 65 or 68 or 70 or 74 or 78 or 80 Shore C. In one preferred version, the geometric center hardness of the inner core ($H_{inner\ core\ center}$) is about 60 Shore C. When a flexible, relatively soft foam is used, the foam may have a Shore A hardness of about 10 or greater, and preferably has a lower limit of 15, 20, 25, 30, or 35 Shore A and an upper limit of about 60, 65, 70, 80, 85, or 90 Shore A. In one preferred embodiment, the geometric center hardness of the inner core is about 55 Shore A. The $H_{inner\ core\ center}$, as measured in Shore D units, is about 15 Shore D or greater and more preferably within a range having a lower limit of about 15 or 18 or 20 or 22 or 25 or 28 or 30 or 32 or 36 or 40 or 44 Shore D and an upper limit of about 45 or 48 or 50 or 52 or 55 or 58 or 60 or 62 or 64 or 66 or 70 or 72 or 74 or 78 or 80 or 82 or 84 or 88 or 90 Shore D. Meanwhile, the outer surface hardness of the inner core (H inner core surface), as measured in Shore C, is about 20 Shore C or greater and preferably has a lower limit of about 13 or 17 or 20 or 22 or 24 or 28 or 30 or 32 or 35 or 36 or 40 or 42 or 44 or 48 or 50 Shore C and an upper limit of about 52 or 55 or 58 or 60 or 62 or 64 or 66 or 70 or 74 or 78 or 80 or 86 or 88 or 90 or 92 or 95 Shore C. The outer surface hardness of the inner core (($H_{inner\ core\ surface}$), as measured in Shore D units, preferably has a lower limit of about 25 or 28 or 30 or 32 or 36 or 40 or 44 Shore D and an upper limit of about 45 or 48 or 50 or 52 or 55 or 58 or 60 or 62 or 64 or 66 or 70 or 74 or 78 or 80 or 82 or 84 or 88 or 90 or 94 or 96 Shore D.

Density of the Inner Core

The foamed inner core preferably has a specific gravity of about 0.25 to about 1.25 g/cc. That is, the density of the inner core (as measured at any point of the inner core structure) is preferably within the range of about 0.25 to about 1.25 g/cc. By the term, "specific gravity of the inner core" ("$SG_{inner}$"), it is generally meant the specific gravity of the inner core as measured at any point of the inner core structure. It should be understood, however, that the specific gravity values, as taken at different points of the inner core structure, may vary. For example, the foamed inner core may have a "positive" density gradient (that is, the outer surface (skin) of the inner core may have a density greater than the geometric center of the inner core.) In one preferred version, the specific gravity of the geometric center of the inner core ($SG_{center\ of\ inner\ core}$) is less than 1.00 g/cc and more preferably 0.90 g/cc or less. More particularly, in one version, the ($SG_{center\ of\ inner\ core}$) is in the range of about 0.10 to about 0.90 g/cc. For example, the ($SG_{center}$ of inner core) may be within a range having a lower limit of about 0.10 or 0.15 of 0.20 or 0.24 or 0.30 or 0.35 or 0.37 or 0.40 or 0.42 or 0.45 or 0.47 or 0.50 and an upper limit of about 0.60 or 0.65 or 0.70 or 0.74 or 0.78 or 0.80, or 0.82 or 0.84 or 0.85 or 0.88 or 0.90 g/cc. Meanwhile, the specific gravity of the outer surface (skin) of the inner core ($SG_{skin\ of\ inner\ core}$), in one preferred version, is greater than about 0.90 g/cc and more preferably greater than 1.00 g/cc. For example, the ($SG_{skin\ of\ inner\ core}$) may fall within the range of about 0.90 to about 2.00. More particularly, in one version, the ($SG_{skin\ of\ inner\ core}$) may have a specific gravity with a lower limit of about 0.90 or 0.92 or 0.95 or 0.98 or 1.00 or 1.02 or 1.06 or 1.10 or 1.12 or 1.15 or 1.18 and an upper limit of about 1.20 or 1.24 or 1.30 or 1.32 or 1.35 or 1.38 or 1.40 or 1.44 or 1.50 or 1.60 or 1.65 or 1.70 or 1.76 or 1.80 or 1.90 or 1.92 or 2.00. In other instances, the outer skin may have a specific gravity of less than 0.90 g/cc. For example, the specific gravity of the outer skin ($SG_{skin\ of\ inner\ core}$) may be about 0.75 or 0.80 or 0.82 or 0.85 or 0.88 g/cc. In such instances, wherein both the ($SG_{center\ of\ inner\ core}$) and ($SG_{skin\ of\ inner\ core}$) are less than 0.90 g/cc, it is still preferred that the ($SG_{center\ of\ inner\ core}$) is less than the ($SG_{skin\ of\ inner\ core}$).

Polyisocyanates and Polyols for Making the Polyurethane Foams

As discussed above, in one preferred embodiment, a foamed polyurethane composition is used to form the inner core. In general, the polyurethane compositions contain urethane linkages formed by reacting an isocyanate group (—N═C═O) with a hydroxyl group (OH). The polyurethanes are produced by the reaction of multi-functional isocyanates containing two or more isocyanate groups with a polyol having two or more hydroxyl groups. The formulation may also contain a catalyst, surfactant, and other additives.

In particular, the foam inner core of this invention may be prepared from a composition comprising an aromatic polyurethane, which is preferably formed by reacting an aromatic diisocyanate with a polyol. Suitable aromatic diisocyanates that may be used in accordance with this invention include, for example, toluene 2,4-diisocyanate (TDI), toluene 2,6-diisocyanate (TDI), 4,4'-methylene diphenyl diisocyanate (MDI), 2,4'-methylene diphenyl diisocyanate (MDI), polymeric methylene diphenyl diisocyanate (PMDI), p-phenylene diisocyanate (PPDI), m-phenylene diisocyanate (PDI), naphthalene 1,5-diisocyanate (NDI), naphthalene 2,4-diisocyanate (NDI), p-xylene diisocyanate (XDI), and homopolymers and copolymers and blends thereof. The aromatic isocyanates are able to react with the hydroxyl or amine compounds and form a durable and tough polymer having a high melting point. The resulting polyurethane generally has good mechanical strength and tear-resistance.

Alternatively, the foamed composition of the inner core may be prepared from a composition comprising aliphatic polyurethane, which is preferably formed by reacting an aliphatic diisocyanate with a polyol. Suitable aliphatic diisocyanates that may be used in accordance with this invention include, for example, isophorone diisocyanate (IPDI), 1,6-hexamethylene diisocyanate (HDI), 4,4'-dicyclohexylmethane diisocyanate ("$H_{12}$ MDI"), meta-tetramethylxylyene diisocyanate (TMXDI), trans-cyclohexane diisocyanate (CHDI), 1,3-bis(isocyanatomethyl)cyclohexane; 1,4-bis(isocyanatomethyl)cyclohexane; and homopolymers and copolymers and blends thereof. The resulting polyurethane generally has good light and thermal stability. Preferred polyfunctional isocyanates include 4,4'-methylene diphenyl diisocyanate (MDI), 2,4'-methylene diphenyl diisocyanate (MDI), and polymeric MDI having a functionality in the range of 2.0 to 3.5 and more preferably 2.2 to 2.5.

Any suitable polyol may be used to react with the polyisocyanate in accordance with this invention. Exemplary polyols include, but are not limited to, polyether polyols, hydroxy-terminated polybutadiene (including partially/fully hydrogenated derivatives), polyester polyols, polycaprolactone polyols, and polycarbonate polyols. In one preferred embodiment, the polyol includes polyether polyol. Examples include, but are not limited to, polytetramethylene ether glycol (PTMEG), polyethylene propylene glycol, polyoxypropylene glycol, and mixtures thereof. The hydrocarbon chain can have saturated or unsaturated bonds and substituted or unsubstituted aromatic and cyclic groups. Preferably, the polyol of the present invention includes PTMEG.

As discussed further below, chain extenders (curing agents) are added to the mixture to build-up the molecular weight of the polyurethane polymer. In general, hydroxyl-terminated curing agents, amine-terminated curing agents, and mixtures thereof are used.

A catalyst may be employed to promote the reaction between the isocyanate and polyol compounds. Suitable catalysts include, but are not limited to, bismuth catalyst; zinc octoate; tin catalysts such as bis-butyltin dilaurate, bis-butyltin diacetate, stannous octoate; tin (II) chloride, tin (IV) chloride, bis-butyltin dimethoxide, dimethyl-bis[1-oxonedecyl) oxy]stannane, di-n-octyltin bis-isooctyl mercaptoacetate; amine catalysts such as triethylenediamine, triethylamine, tributylamine, 1,4-diaza(2,2,2)bicyclooctane, tetramethylbutane diamine, bis[2-dimethylaminoethyl]ether, N,N-dimethylaminopropylamine, N,N-dimethylcyclohexylamine, N,N,N',N',N''-pentamethyldiethylenetriamine, diethanolamine, dimethtlethanolamine, N-[2-(dimethylamino)ethyl]-N-methylethanolamine, N-ethylmorpholine, 3-dimethylamino-N,N-dimethylpropionamide, and N,N',N''-dimethylaminopropylhexahydrotriazine; organic acids such as oleic acid and acetic acid; delayed catalysts; and mixtures thereof. Zirconium-based catalysts such as, for example, bis (2-dimethyl aminoethyl) ether; mixtures of zinc complexes and amine compounds such as KKAT™ XK 614, available from King Industries; and amine catalysts such as Niax™ A-2 and A-33, available from Momentive Specialty Chemicals, Inc. are particularly preferred. The catalyst is preferably added in an amount sufficient to catalyze the reaction of the components in the reactive mixture. In one embodiment, the catalyst is present in an amount from about 0.001 percent to about 1 percent, and preferably 0.1 to 0.5 percent, by weight of the composition.

In one preferred embodiment, as described above, water is used as the foaming agent—the water reacts with the polyisocyanate compound(s) and forms carbon dioxide gas which induces foaming of the mixture. The reaction rate of the water and polyisocyanate compounds affects how quickly the foam is formed as measured per reaction profile properties such as cream time, gel time, and rise time of the foam.

The hydroxyl chain-extending (curing) agents are preferably selected from the group consisting of ethylene glycol; diethylene glycol; polyethylene glycol; propylene glycol; 2-methyl-1,3-propanediol; 2-methyl-1,4-butanediol; monoethanolamine; diethanolamine; triethanolamine; monoisopropanolamine; diisopropanolamine; dipropylene glycol; polypropylene glycol; 1,2-butanediol; 1,3-butanediol; 1,4-butanediol; 2,3-butanediol; 2,3-dimethyl-2,3-butanediol; trimethylolpropane; cyclohexyldimethylol; triisopropanolamine; N,N,N',N'-tetra-(2-hydroxypropyl)-ethylene diamine; diethylene glycol bis-(aminopropyl) ether; 1,5-pentanediol; 1,6-hexanediol; 1,3-bis-(2-hydroxyethoxy) cyclohexane; 1,4-cyclohexyldimethylol; 1,3-bis-[2-(2-hydroxyethoxy) ethoxy]cyclohexane; 1,3-bis-{2-[2-(2-hydroxyethoxyl) ethoxy]ethoxy}cyclohexane; trimethylolpropane; polytetramethylene ether glycol (PTMEG), preferably having a molecular weight from about 250 to about 3900; and mixtures thereof. Di, tri, and tetra-functional polycaprolactone diols such as, 2-oxepanone polymer initiated with 1,4-butanediol, 2-ethyl-2-(hydroxymethyl)-1,3-propanediol, or 2,2-bis(hydroxymethyl)-1,3-propanediolsuch, may be used.

Suitable amine chain-extending (curing) agents that can be used in chain-extending the polyurethane prepolymer include, but are not limited to, unsaturated diamines such as 4,4'-diamino-diphenylmethane (i.e., 4,4'-methylene-dianiline or "MDA"), m-phenylenediamine, p-phenylenediamine, 1,2- or 1,4-bis(sec-butylamino)benzene, 3,5-diethyl-(2,4- or 2,6-) toluenediamine or "DETDA", 3,5-dimethylthio-(2,4- or 2,6-)toluenediamine, 3,5-diethylthio-(2,4- or 2,6-)toluenediamine, 3,3'-dimethyl-4,4'-diamino-diphenylmethane, 3,3'-diethyl-5,5'-dimethyl4,4'-diamino-diphenylmethane (i.e., 4,4'-methylene-bis(2-ethyl-6-methyl-benezeneamine)), 3,3'-dichloro-4,4'-diamino-diphenylmethane (i.e., 4,4'-methylene-bis(2-chloroaniline) or "MOCA"), 3,3',5,5'-tetraethyl-4,4'-diamino-diphenylmethane (i.e., 4,4'-methylene-bis(2,6-diethylaniline), 2,2'-dichloro-3,3',5,5'-tetraethyl-4,4'-diamino-diphenylmethane (i.e., 4,4'-methylene-bis(3-chloro-2,6-diethyleneaniline) or "MCDEA"), 3,3'-diethyl-5,5'-dichloro-4,4'-diamino-diphenylmethane, or "MDEA"), 3,3'-dichloro-2,2',6,6'-tetraethyl-4,4'-diamino-diphenylmethane, 3,3'-dichloro-4,4'-diamino-diphenylmethane, 4,4'-methylene-bis(2,3-dichloroaniline) (i.e., 2,2',3,3'-tetrachloro-4,4'-diamino-diphenylmethane or "MDCA"), 4,4'-bis(sec-butylamino)-diphenylmethane, N,N'-dialkylamino-diphenylmethane, trimethyleneglycol-di (p-aminobenzoate), polyethyleneglycol-di(p-aminobenzoate), polytetramethyleneglycol-di(p-aminobenzoate); saturated diamines such as ethylene diamine, 1,3-propylene diamine, 2-methyl-pentamethylene diamine, hexamethylene diamine, 2,2,4- and 2,4,4-trimethyl-1,6-hexane diamine, imino-bis(propylamine), imido-bis(propylamine), methylimino-bis(propylamine) (i.e., N-(3-aminopropyl)-N-methyl-1,3-propanediamine), 1,4-bis(3-aminopropoxy)butane (i.e., 3,3'-[1,4-butanediylbis-(oxy)bis]-1-propanamine), diethyleneglycol-bis(propylamine) (i.e., diethyleneglycol-di (aminopropyl)ether), 4,7,10-trioxatridecane-1,13-diamine, 1-methyl-2,6-diamino-cyclohexane, 1,4-diamino-cyclohexane, poly(oxyethylene-oxypropylene) diamines, 1,3- or 1,4-bis(methylamino)-cyclohexane, isophorone diamine, 1,2- or 1,4-bis(sec-butylamino)-cyclohexane, N,N'-diisopropyl-isophorone diamine, 4,4'-diamino-dicyclohexylmethane, 3,3'-dimethyl-4,4'-diamino-dicyclohexylmethane, 3,3'-dichloro-4,4'-diamino-dicyclohexylmethane, N,N'-dialkylamino-dicyclohexylmethane, polyoxyethylene diamines, 3,3'-diethyl-5,5'-dimethyl-4,4'-diamino-dicyclohexylmethane, polyoxypropylene diamines, 3,3'-diethyl-5,5'-dichloro-4,4'-diamino-dicyclohexylmethane, polytetramethylene ether diamines, 3,3',5,5 '-tetraethyl-4,4'-diamino-dicyclohexylmethane (i.e., 4,4'-methylene-bis(2,6-diethylaminocyclohexane)), 3,3'-dichloro-4,4'-diamino-dicyclohexylmethane, 2,2'-dichloro-3,3',5,5'-tetraethyl-4,4'-diamino-dicyclohexylmethane, (ethylene oxide)-capped polyoxypropylene ether diamines, 2,2',3,3'-tetrachloro-4,4'-diamino-dicyclohexylmethane, 4,4'-bis(sec-butylamino)-dicyclohexylmethane; triamines such as diethylene triamine, dipropylene triamine, (propylene oxide)-based triamines (i.e., polyoxypropylene triamines), N-(2-aminoethyl)-1,3-propylenediamine (i.e., $N_3$-amine), glycerin-based triamines, (all saturated); tetramines such as N,N'-bis(3-aminopropyl)ethylene diamine (i.e., $N_4$-amine) (both saturated), triethylene tetramine; and other polyamines such as tetraethylene pentamine (also saturated). One suitable amine-terminated chain-extending agent is Ethacure 300™ (dimethylthiotoluenediamine or a mixture of 2,6-diamino-3,5-dimethylthiotoluene and 2,4-diamino-3, 5-dimethylthiotoluene.) The amine curing agents used as chain extenders normally have a cyclic structure and a low molecular weight (250 or less).

When a hydroxyl-terminated curing agent is used, the resulting polyurethane composition contains urethane linkages. On the other hand, when an amine-terminated curing agent is used, any excess isocyanate groups will react with the amine groups in the curing agent. The resulting polyurethane composition contains urethane and urea linkages and may be referred to as a polyurethane/urea hybrid.

Two-Layered Cores

As discussed above, the inner core (center) is made preferably from a foamed composition. Preferably, a two-layered or dual-core is made, wherein the inner core is surrounded by an outer core layer. In one preferred embodiment, the outer core layer is formed from a non-foamed thermoset composition and more preferably from a non-foamed thermoset rubber composition.

Suitable thermoset rubber materials that may be used to form the outer core layer include, but are not limited to, polybutadiene, polyisoprene, ethylene propylene rubber ("EPR"), ethylene-propylene-diene ("EPDM") rubber, styrene-butadiene rubber, styrenic block copolymer rubbers (such as "SI", "SIS", "SB", "SBS", "SIBS", and the like, where "S" is styrene, "I" is isobutylene, and "B" is butadiene), polyalkenamers such as, for example, polyoctenamer, butyl rubber, halobutyl rubber, polystyrene elastomers, polyethylene elastomers, polyurethane elastomers, polyurea elastomers, metallocene-catalyzed elastomers and plastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and blends of two or more thereof. Preferably, the outer core layer is formed from a polybutadiene rubber composition.

The thermoset rubber composition may be cured using conventional curing processes. Suitable curing processes include, for example, peroxide-curing, sulfur-curing, high-energy radiation, and combinations thereof. Preferably, the rubber composition contains a free-radical initiator selected from organic peroxides, high energy radiation sources capable of generating free-radicals, and combinations thereof. In one preferred version, the rubber composition is peroxide-cured. Suitable organic peroxides include, but are not limited to, dicumyl peroxide; n-butyl-4,4-di(t-butylperoxy) valerate; 1,1-di(t-butylperoxy)3,3,5-trimethylcyclohexane; 2,5-dimethyl-2,5-di(t-butylperoxy) hexane; di-t-butyl peroxide; di-t-amyl peroxide; t-butyl peroxide; t-butyl cumyl peroxide; 2,5-dimethyl-2,5-di(t-butylperoxy)hexyne-3; di(2-t-butyl-peroxyisopropyl)benzene; dilauroyl peroxide; dibenzoyl peroxide; t-butyl hydroperoxide; and combinations thereof. In a particular embodiment, the free radical initiator is dicumyl peroxide, including, but not limited to Perkadox® BC, commercially available from Akzo Nobel. Peroxide free-radical initiators are generally present in the rubber composition in an amount of at least 0.05 parts by weight per 100 parts of the total rubber, or an amount within the range having a lower limit of 0.05 parts or 0.1 parts or 1 part or 1.25 parts or 1.5 parts or 2.5 parts or 5 parts by weight per 100 parts of the total rubbers, and an upper limit of 2.5 parts or 3 parts or 5 parts or 6 parts or 10 parts or 15 parts by weight per 100 parts of the total rubber. Concentrations are in parts per hundred (phr) unless otherwise indicated. As used herein, the term, "parts per hundred," also known as "phr" or "pph" is defined as the number of parts by weight of a particular component present in a mixture, relative to 100 parts by weight of the polymer component. Mathematically, this can be expressed as the weight of an ingredient divided by the total weight of the polymer, multiplied by a factor of 100.

The rubber compositions may further include a reactive cross-linking co-agent. Suitable co-agents include, but are not limited to, metal salts of unsaturated carboxylic acids having from 3 to 8 carbon atoms; unsaturated vinyl compounds and polyfunctional monomers (e.g., trimethylolpropane trimethacrylate); phenylene bismaleimide; and combinations thereof. Particular examples of suitable metal salts include, but are not limited to, one or more metal salts of acrylates, diacrylates, methacrylates, and dimethacrylates, wherein the metal is selected from magnesium, calcium, zinc, aluminum, lithium, and nickel. In a particular embodiment, the co-agent is selected from zinc salts of acrylates, diacrylates, methacrylates, and dimethacrylates. In another particular embodiment, the agent is zinc diacrylate (ZDA). When the co-agent is zinc diacrylate and/or zinc dimethacrylate, the co-agent is typically included in the rubber composition in an amount within the range having a lower limit of 1 or 5 or 10 or 15 or 19 or 20 parts by weight per 100 parts of the total rubber, and an upper limit of 24 or 25 or 30 or 35 or 40 or 45 or 50 or 60 parts by weight per 100 parts of the base rubber.

Radical scavengers such as a halogenated organosulfur, organic disulfide, or inorganic disulfide compounds may be added to the rubber composition. These compounds also may function as "soft and fast agents." As used herein, "soft and fast agent" means any compound or a blend thereof that is capable of making a core: 1) softer (having a lower compression) at a constant "coefficient of restitution" (COR); and/or 2) faster (having a higher COR at equal compression), when compared to a core equivalently prepared without a soft and fast agent. Preferred halogenated organosulfur compounds include, but are not limited to, pentachlorothiophenol (PCTP) and salts of PCTP such as zinc pentachlorothiophenol (Zn-PCTP). Using PCTP and ZnPCTP in golf ball inner cores helps produce softer and faster inner cores. The PCTP and ZnPCTP compounds help increase the resiliency and the coefficient of restitution of the core. In a particular embodiment, the soft and fast agent is selected from ZnPCTP, PCTP, ditolyl disulfide, diphenyl disulfide, dixylyl disulfide, 2-nitroresorcinol, and combinations thereof.

The rubber composition also may include filler(s) such as materials selected from carbon black, clay and nanoclay particles as discussed above, talc (e.g., Luzenac HAR® high aspect ratio talcs, commercially available from Luzenac America, Inc.), glass (e.g., glass flake, milled glass, and microglass), mica and mica-based pigments (e.g., Iriodin® pearl luster pigments, commercially available from The Merck Group), and combinations thereof. Metal fillers such as, for example, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof also may be added to the rubber composition to adjust the specific gravity of the composition as needed. As discussed further below, in one preferred embodiment, the specific gravity of the inner core layer (for example, foamed polyurethane) has a specific gravity less than the outer core layer (for example, polybutadiene rubber). In such an event, if mineral, metal, or other fillers are added to the polybutadiene rubber composition used to form the outer core, it is important the concentration of such fillers be sufficient so that the specific gravity of the outer core layer is greater than the specific gravity of the inner core. For example, the concentration of the fillers may be in an amount of at least about 5% by weight based on total weight of composition In addition, the rubber compositions may include antioxidants to prevent the breakdown of the elastomers. Also, processing aids such as high molecular weight organic acids and salts thereof may be added to the composition. Suitable organic acids are aliphatic organic acids, aromatic organic acids, saturated mono-functional organic acids, unsaturated monofunctional organic acids, multi-unsaturated mono-functional organic acids, and dimerized derivatives thereof. Particular examples of suitable organic acids include, but are not limited to, caproic acid, caprylic acid, capric acid, lauric acid, stearic acid, behenic acid, erucic acid, oleic acid, linoleic acid, myristic acid, benzoic acid, palmitic acid, phenylacetic acid, naphthalenoic acid, and dimerized derivatives thereof. The organic acids are aliphatic, mono-functional (saturated, unsaturated, or multi-unsaturated) organic acids. Salts of these organic acids may also be employed. The salts of organic acids include the salts of barium, lithium, sodium, zinc, bismuth, chromium, cobalt, copper, potassium, strontium, titanium, tungsten, magnesium, cesium, iron, nickel, silver, aluminum, tin, or calcium, salts of fatty acids, particularly stearic, behenic, erucic, oleic, linoelic or dimerized derivatives thereof. It is preferred that the organic acids and salts of the present invention be relatively non-migratory (they do not bloom to the surface of the polymer under ambient temperatures) and non-volatile (they do not volatilize at temperatures required for melt-blending.) Other ingredients such as accelerators (for example, tetra methylthiuram), processing aids, dyes and pigments, wetting agents, surfactants, plasticizers, coloring agents, fluorescent agents, chemical blowing and foaming agents, defoaming agents, stabilizers, softening agents, impact modifiers, antiozonants, as well as other additives known in the art may be added to the rubber composition.

Examples of commercially-available polybutadiene rubbers that can be used in accordance with this invention, include, but are not limited to, BR 01 and BR 1220, available from BST Elastomers of Bangkok, Thailand; SE BR 1220LA and SE BR1203, available from DOW Chemical Co of Midland, Mich.; BUDENE 1207, 1207s, 1208, and 1280 available from Goodyear, Inc of Akron, Ohio; BR 01, 51 and 730, available from Japan Synthetic Rubber (JSR) of Tokyo, Japan; BUNA CB 21, CB 22, CB 23, CB 24, CB 25, CB 29 MES, CB 60, CB Nd 60, CB 55 NF, CB 70 B, CB KA 8967, and CB 1221, available from Lanxess Corp. of Pittsburgh. Pa.; BR1208, available from LG Chemical of Seoul, South Korea; UBEPOL BR130B, BR150, BR150B, BR150L, BR230, BR360L, BR710, and VCR617, available from UBE Industries, Ltd. of Tokyo, Japan; EUROPRENE NEOCIS BR 60, INTENE 60 AF and P30AF, and EUROPRENE BR HV80, available from Polimeri Europa of Rome, Italy; AFDENE 50 and NEODENE BR40, BR45, BR50 and BR60, available from Karbochem (PTY) Ltd. of Bruma, South Africa; KBR 01, NdBr 40, NdBR-45, NdBr 60, KBR 710S, KBR 710H, and KBR 750, available from Kumho Petrochemical Co., Ltd. Of Seoul, South Korea; DIENE 55NF, 70AC, and 320 AC, available from Firestone Polymers of Akron, Ohio; and PBR-Nd Group II and Group III, available from Nizhnekamskneftekhim, Inc. of Nizhnekamsk, Tartarstan Republic.

The polybutadiene rubber is used in an amount of at least about 5% by weight based on total weight of composition and is generally present in an amount of about 5% to about 100%, or an amount within a range having a lower limit of 5% or 10% or 20% or 30% or 40% or 50% and an upper limit of 55% or 60% or 70% or 80% or 90% or 95% or 100%. Preferably, the concentration of polybutadiene rubber is about 40 to about 95 weight percent. If desirable, lesser amounts of other thermoset materials may be incorporated into the base rubber. Such materials include the rubbers discussed above, for example, cis-polyisoprene, trans-polyisoprene, balata, polychloroprene, polynorbornene, polyoctenamer, polypentenamer, butyl rubber, EPR, EPDM, styrene-butadiene, and the like.

In alternative embodiments, the outer core layer may comprise a thermoplastic material, for example, an ionomer composition containing acid groups that are at least partially-neutralized. Suitable ionomer compositions include partially-neutralized ionomers and highly-neutralized ionomers (HNPs), including ionomers formed from blends of two or more partially-neutralized ionomers, blends of two or more highly-neutralized ionomers, and blends of one or more partially-neutralized ionomers with one or more highly-neutralized ionomers. For purposes of the present disclosure, "HNP" refers to an acid copolymer after at least 70% of all acid groups present in the composition are neutralized. Preferred ionomers are salts of O/X- and O/X/Y-type acid copolymers, wherein O is an α-olefin, X is a $C_3$-$C_8$ α,β-ethylenically unsaturated carboxylic acid, and Y is a softening monomer. O is preferably selected from ethylene and propylene. X is preferably selected from methacrylic acid, acrylic acid, ethacrylic acid, crotonic acid, and itaconic acid. Methacrylic acid and acrylic acid are particularly preferred. Y is preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate.

Preferred O/X and O/X/Y-type copolymers include, without limitation, ethylene acid copolymers, such as ethylene/(meth)acrylic acid, ethylene/(meth)acrylic acid/maleic anhydride, ethylene/(meth)acrylic acid/maleic acid mono-ester, ethylene/maleic acid, ethylene/maleic acid mono-ester, ethylene/(meth)acrylic acid/n-butyl (meth)acrylate, ethylene/(meth)acrylic acid/iso-butyl (meth)acrylate, ethylene/(meth) acrylic acid/methyl (meth)acrylate, ethylene/(meth)acrylic acid/ethyl (meth)acrylate terpolymers, and the like. The term, "copolymer," as used herein, includes polymers having two types of monomers, those having three types of monomers, and those having more than three types of monomers. Preferred α,β-ethylenically unsaturated mono- or dicarboxylic acids are (meth) acrylic acid, ethacrylic acid, maleic acid, crotonic acid, fumaric acid, itaconic acid. (Meth) acrylic acid is most preferred. As used herein, "(meth) acrylic acid" means methacrylic acid and/or acrylic acid. Likewise, "(meth) acrylate" means methacrylate and/or acrylate.

In a particularly preferred version, highly neutralized E/X- and E/X/Y-type acid copolymers, wherein E is ethylene, X is a $C_3$-$C_8$ α,β-ethylenically unsaturated carboxylic acid, and Y is a softening monomer are used. X is preferably selected from methacrylic acid, acrylic acid, ethacrylic acid, crotonic acid, and itaconic acid. Methacrylic acid and acrylic acid are particularly preferred. Y is preferably an acrylate selected from alkyl acrylates and aryl acrylates and preferably selected from (meth) acrylate and alkyl (meth) acrylates wherein the alkyl groups have from 1 to 8 carbon atoms, including, but not limited to, n-butyl (meth) acrylate, isobutyl (meth) acrylate, methyl (meth) acrylate, and ethyl (meth) acrylate. Preferred E/X/Y-type copolymers are those wherein X is (meth) acrylic acid and/or Y is selected from (meth) acrylate, n-butyl (meth) acrylate, isobutyl (meth) acrylate, methyl (meth) acrylate, and ethyl (meth) acrylate. More preferred E/X/Y-type copolymers are ethylene/(meth) acrylic acid/n-butyl acrylate, ethylene/(meth) acrylic acid/methyl acrylate, and ethylene/(meth) acrylic acid/ethyl acrylate.

The amount of ethylene in the acid copolymer is typically at least 15 wt. %, preferably at least 25 wt. %, more preferably least 40 wt. %, and even more preferably at least 60 wt. %, based on total weight of the copolymer. The amount of $C_3$ to $C_8$ α,β-ethylenically unsaturated mono- or dicarboxylic acid in the acid copolymer is typically from 1 wt. % to 35 wt. %, preferably from 5 wt. % to 30 wt. %, more preferably from 5 wt. % to 25 wt. %, and even more preferably from 10 wt. % to 20 wt. %, based on total weight of the copolymer. The amount of optional softening comonomer in the acid copolymer is typically from 0 wt. % to 50 wt. %, preferably from 5 wt. % to 40 wt. %, more preferably from 10 wt. % to 35 wt. %, and even more preferably from 20 wt. % to 30 wt. %, based on total weight of the copolymer. "Low acid" and "high acid" ionomeric polymers, as well as blends of such ionomers, may be used. In general, low acid ionomers are considered to be those containing 16 wt. % or less of acid moieties, whereas high acid ionomers are considered to be those containing greater than 16 wt. % of acid moieties.

The various O/X, E/X, O/X/Y, and E/X/Y-type copolymers are at least partially neutralized with a cation source, optionally in the presence of a high molecular weight organic acid, such as those disclosed in U.S. Pat. No. 6,756,436, the entire disclosure of which is hereby incorporated herein by reference. The acid copolymer can be reacted with the optional high molecular weight organic acid and the cation source simultaneously, or prior to the addition of the cation source. Suitable cation sources include, but are not limited to, metal ion sources, such as compounds of alkali metals, alkaline earth metals, transition metals, and rare earth elements; ammonium salts and monoamine salts; and combinations thereof. Preferred cation sources are compounds of magnesium, sodium, potassium, cesium, calcium, barium, manganese, copper, zinc, lead, tin, aluminum, nickel, chromium, lithium, and rare earth metals.

Other suitable thermoplastic polymers that may be used to form the outer core layer include, but are not limited to, the following polymers (including homopolymers, copolymers, and derivatives thereof.)

(a) polyesters, particularly those modified with a compatibilizing group such as sulfonate or phosphonate, including modified poly(ethylene terephthalate), modified poly(butylene terephthalate), modified poly(propylene terephthalate), modified poly(trimethylene terephthalate), modified poly (ethylene naphthenate), and those disclosed in U.S. Pat. Nos. 6,353,050, 6,274,298, and 6,001,930, the entire disclosures of which are hereby incorporated herein by reference, and blends of two or more thereof;

(b) polyamides, polyamide-ethers, and polyamide-esters, and those disclosed in U.S. Pat. Nos. 6,187,864, 6,001,930, and 5,981,654, the entire disclosures of which are hereby incorporated herein by reference, and blends of two or more thereof;

(c) polyurethanes, polyureas, polyurethane-polyurea hybrids, and blends of two or more thereof;

(d) fluoropolymers, such as those disclosed in U.S. Pat. Nos. 5,691,066, 6,747,110 and 7,009,002, the entire disclosures of which are hereby incorporated herein by reference, and blends of two or more thereof;

(e) polystyrenes, such as poly(styrene-co-maleic anhydride), acrylonitrile-butadiene-styrene, poly(styrene sulfonate), polyethylene styrene, and blends of two or more thereof;

(f) polyvinyl chlorides and grafted polyvinyl chlorides, and blends of two or more thereof;

(g) polycarbonates, blends of polycarbonate/acrylonitrile-butadiene-styrene, blends of polycarbonate/polyurethane, blends of polycarbonate/polyester, and blends of two or more thereof;

(h) polyethers, such as polyarylene ethers, polyphenylene oxides, block copolymers of alkenyl aromatics with vinyl aromatics and polyamicesters, and blends of two or more thereof;

(i) polyimides, polyetherketones, polyamideimides, and blends of two or more thereof; and (j) polycarbonate/polyester copolymers and blends.

It also is recognized that thermoplastic materials can be "converted" into thermoset materials by cross-linking the polymer chains so they form a network structure, and such cross-linked thermoplastic materials may be used to form the core layers in accordance with this invention. For example, thermoplastic polyolefins such as linear low density polyethylene (LLDPE), low density polyethylene (LDPE), and high density polyethylene (HDPE) may be cross-linked to form bonds between the polymer chains. The cross-linked thermoplastic material typically has improved physical properties and strength over non-cross-linked thermoplastics, particularly at temperatures above the crystalline melting point. Preferably a partially or fully-neutralized ionomer, as described above, is covalently cross-linked to render it into a thermoset composition (that is, it contains at least some level of covalent, irreversable cross-links). Thermoplastic polyurethanes and polyureas also may be converted into thermoset materials in accordance with the present invention.

The cross-linked thermoplastic material may be created by exposing the thermoplastic to: 1) a high-energy radiation treatment, such as electron beam or gamma radiation, such as disclosed in U.S. Pat. No. 5,891,973, which is incorporated by reference herein, 2) lower energy radiation, such as ultraviolet (UV) or infra-red (IR) radiation; 3) a solution treatment, such as an isocyanate or a silane; 4) incorporation of additional free radical initiator groups in the thermoplastic prior to molding; and/or 5) chemical modification, such as esterification or saponification, to name a few.

Modifications in thermoplastic polymeric structure of thermoplastic can be induced by a number of methods, including exposing the thermoplastic material to high-energy radiation or through a chemical process using peroxide. Radiation sources include, but are not limited to, gamma-rays, electrons, neutrons, protons, x-rays, helium nuclei, or the like. Gamma radiation, typically using radioactive cobalt atoms and allows for considerable depth of treatment, if necessary. For core layers requiring lower depth of penetration, electron-beam accelerators or UV and IR light sources can be used. Useful UV and IR irradiation methods are disclosed in U.S. Pat. Nos. 6,855,070 and 7,198,576, which are incorporated herein by reference. The thermoplastic core layers may be irradiated at dosages greater than 0.05 Mrd, preferably ranging from 1 Mrd to 20 Mrd, more preferably from 2 Mrd to 15 Mrd, and most preferably from 4 Mrd to 10 Mrd. In one preferred embodiment, the cores are irradiated at a dosage from 5 Mrd to 8 Mrd and in another preferred embodiment, the cores are irradiated with a dosage from 0.05 Mrd to 3 Mrd, more preferably 0.05 Mrd to 1.5 Mrd.

For example, a core assembly having a thermoplastic layer may be converted to a thermoset layer by placing the core assembly on a slowly move along a channel. Radiation from a radiation source, such as gamma rays, is allowed to contact the surface of the cores. The source is positioned to provide a generally uniform dose of radiation to the cores as they roll along the channel. The speed of the cores as they pass through the radiation source is easily controlled to ensure the cores receive sufficient dosage to create the desired hardness gradient. The cores are irradiated with a dosage of 1 or more Mrd, more preferably 2 Mrd to 15 Mrd. The intensity of the dosage is typically in the range of 1 MeV to 20 MeV. For thermoplastic resins having a reactive group (e.g., ionomers, thermoplastic urethanes, and the like), treating the thermoplastic core layer in a chemical solution of an isocyanate or an amine affects cross-linking and provides a harder surface and subsequent hardness gradient. Incorporation of peroxide or other free-radical initiator in the thermoplastic polymer, prior to molding or forming, also allows for heat curing on the molded core layer to create the desired hardness gradient. By proper selection of time/temperature, an annealing process can be used to create a gradient. Suitable annealing and/or peroxide (free radical) methods are such as disclosed in U.S. Pat. Nos. 5,274,041 and 5,356,941, respectively, which are incorporated by reference herein. Additionally, silane or amino-silane crosslinking may also be employed as disclosed in U.S. Pat. No. 7,279,529, the disclosure of which incorporated herein by reference. The core layer may be chemically treated in a solution, such as a solution containing one or more isocyanates, to form the desired "positive hardness gradient." The cores are typically exposed to the solution containing the isocyanate by immersing them in a bath at a particular temperature for a given time. Exposure time should be greater than 1 minute, preferably from 1 minute to 120 minutes, more preferably 5 minutes to 90 minutes, and most preferably 10 minutes to 60 minutes. In one preferred embodiment, the cores are immersed in the treating solution from 15 minutes to 45 minutes, more preferably from 20 minutes to 40 minutes, and most preferably from 25 minutes to 30 minutes.

The core layers may be chemically treated in a solution, such as a solution containing one or more isocyanates, to form the desired "positive hardness gradient." The cores are typically exposed to the solution containing the isocyanate by immersing them in a bath at a particular temperature for a given time. Exposure time should be greater than 1 minute, preferably from 1 minute to 120 minutes, more preferably 5 minutes to 90 minutes, and most preferably 10 minutes to 60 minutes. In one preferred embodiment, the cores are immersed in the treating solution from 15 minutes to 45 minutes, more preferably from 20 minutes to 40 minutes, and most preferably from 25 minutes to 30 minutes. Both irradiative and chemical methods promote molecular bonding, or cross-links, within the TP polymer. Radiative methods permit cross-linking and grafting in situ on finished products and cross-linking occurs at lower temperatures with radiation than with chemical processing. Chemical methods depend on the particular polymer, the presence of modifying agents, and variables in processing, such as the level of irradiation. Significant property benefits in the thermoplastic materials can be attained and include, but are not limited to, improved thermomechanical properties; lower permeability and improved chemical resistance; reduced stress cracking; and overall improvement in physical toughness.

Additional embodiments involve the use of plasticizers to treat the core layers, thereby creating a softer outer portion of the core for a "negative" hardness gradient. The plasticizer may be reactive (such as higher alkyl acrylates) or non-reactive (that is, phthalates, dioctylphthalate, or stearamides, etc). Other suitable plasticizers include, but are not limited to, oxa acids, fatty amines, fatty amides, fatty acid esters, phthalates, adipates, and sebacates. Oxa acids are preferred plasticizers, more preferably those having at least one or two acid functional groups and a variety of different chain lengths. Preferred oxa acids include 3,6-dioxaheptanoic acid, 3,6,9-trioxadecanoic acid, diglycolic acid, 3,6,9-trioxaundecanoic acid, polyglycol diacid, and 3,6-dioxaoctanedioic acid, such as those commercially available from Archimica of Wilmington, Del. Any means of chemical degradation will also result in a "negative" hardness gradient. Chemical modifications such as esterification or saponification are also suitable for modification of the thermoplastic core layer surface and can result in the desired "positive" hardness gradient.

Core Structure

Figure 3:
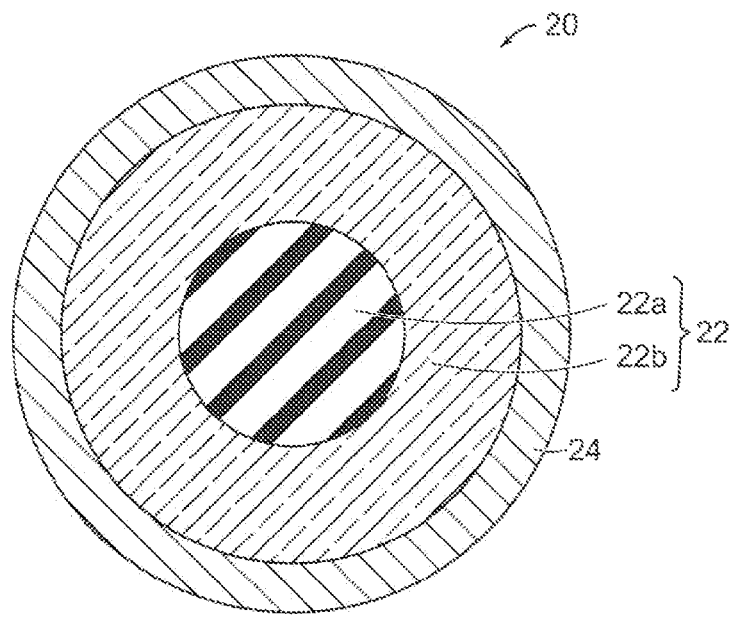
FIG. 3 is a cross-sectional view of a three-piece golf ball having a dual-layered core made in accordance with the present invention.

As discussed above, the core of the golf ball of this invention preferably has a dual-layered structure comprising an inner core and outer core layer. Referring to FIG. 3, one version of a golf ball that can be made in accordance with this invention is generally indicated at (20). The ball (20) contains a dual-layered core (22) having an inner core (center) (22a) and outer core layer (22b) surrounded by a single-layered cover (24). The inner core (22a) is relatively small in volume and generally has a diameter within a range of about 0.10 to about 1.10 inches. More particularly, the inner core (22a) preferably has a diameter size with a lower limit of about 0.15 or 0.25 or 0.35 or 0.45 or 0.55 inches and an upper limit of about 0.60 or 0.70 or 0.80 or 0.90 inches. In one preferred version, the diameter of the inner core (22a) is in the range of about 0.025 to about 0.080 inches, more preferably about 0.030 to about 0.075 inches. Meanwhile, the outer core layer (22b) generally has a thickness within a range of about 0.010 to about 0.250 inches and preferably has a lower limit of 0.010 or 0.020 or 0.025 or 0.030 inches and an upper limit of 0.070 or 0.080 or 0.100 or 0.200 inches. In one preferred version, the outer core layer has a thickness in the range of about 0.040 to about 0.170 inches, more preferably about 0.060 to about 0.150 inches.

Figure 4:
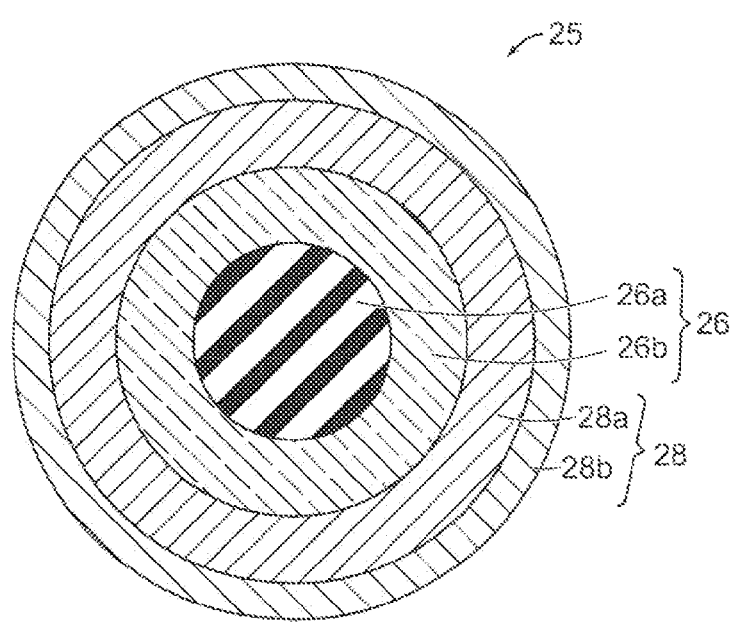
FIG. 4 is a cross-sectional view of a four-piece golf ball having a dual-layered core made in accordance with the present invention.

Referring to FIG. 4, in another version, the golf ball (25) contains a dual-core (26) having an inner core (center) (26a) and outer core layer (26b). The dual-core (26) is surrounded by a multi-layered cover (28) having an inner cover layer (28a) and outer cover layer (28b).

The hardness of the core sub-assembly (inner core and outer core layer) is an important property. In general, cores with relatively high hardness values have higher compression and tend to have good durability and resiliency. However, some high compression balls are stiff and this may have a detrimental effect on shot control and placement. Thus, the optimum balance of hardness in the core sub-assembly needs to be attained.

In one preferred golf ball, the inner core (center) has a "positive" hardness gradient (that is, the outer surface of the inner core is harder than its geometric center); and the outer core layer has a "positive" hardness gradient (that is, the outer surface of the outer core layer is harder than the inner surface of the outer core layer.) In such cases where both the inner core and outer core layer each has a "positive" hardness gradient, the outer surface hardness of the outer core layer is preferably greater than the hardness of the geometric center of the inner core. In one preferred version, the positive hardness gradient of the inner core is in the range of about 2 to about 40 Shore C units and even more preferably about 10 to about 25 Shore C units; while the positive hardness gradient of the outer core is in the range of about 2 to about 20 Shore C and even more preferably about 3 to about 10 Shore C.

In an alternative version, the inner core may have a positive hardness gradient; and the outer core layer may have a "zero" hardness gradient (that is, the hardness values of the outer surface of the outer core layer and the inner surface of the outer core layer are substantially the same) or a "negative" hardness gradient (that is, the outer surface of the outer core layer is softer than the inner surface of the outer core layer.) For example, in one version, the inner core has a positive hardness gradient; and the outer core layer has a negative hardness gradient in the range of about 2 to about 25 Shore C. In a second alternative version, the inner core may have a zero or negative hardness gradient; and the outer core layer may have a positive hardness gradient. Still yet, in another embodiment, both the inner core and outer core layers have zero or negative hardness gradients.

In general, hardness gradients are further described in Bulpett et al., U.S. Pat. Nos. 7,537,529 and 7,410,429, the disclosures of which are hereby incorporated by reference. Methods for measuring the hardness of the inner core and outer core layers along with other layers in the golf ball and determining the hardness gradients of the various layers are described in further detail below. The core layers have positive, negative, or zero hardness gradients defined by hardness measurements made at the outer surface of the inner core (or outer surface of the outer core layer) and radially inward towards the center of the inner core (or inner surface of the outer core layer). These measurements are made typically at 2-mm increments as described in the test methods below. In general, the hardness gradient is determined by subtracting the hardness value at the innermost portion of the component being measured (for example, the center of the inner core or inner surface of the outer core layer) from the hardness value at the outer surface of the component being measured (for example, the outer surface of the inner core or outer surface of the outer core layer).

Positive Hardness Gradient. For example, if the hardness value of the outer surface of the inner core is greater than the hardness value of the inner core's geometric center (that is, the inner core has a surface harder than its geometric center), the hardness gradient will be deemed "positive" (a larger number minus a smaller number equals a positive number.) For example, if the outer surface of the inner core has a hardness of 67 Shore C and the geometric center of the inner core has a hardness of 60 Shore C, then the inner core has a positive hardness gradient of 7. Likewise, if the outer surface of the outer core layer has a greater hardness value than the inner surface of the outer core layer, the given outer core layer will be considered to have a positive hardness gradient.

Negative Hardness Gradient. On the other hand, if the hardness value of the outer surface of the inner core is less than the hardness value of the inner core's geometric center (that is, the inner core has a surface softer than its geometric center), the hardness gradient will be deemed "negative." For example, if the outer surface of the inner core has a hardness of 68 Shore C and the geometric center of the inner core has a hardness of 70 Shore C, then the inner core has a negative hardness gradient of 2. Likewise, if the outer surface of the outer core layer has a lesser hardness value than the inner surface of the outer core layer, the given outer core layer will be considered to have a negative hardness gradient.

Zero Hardness Gradient. In another example, if the hardness value of the outer surface of the inner core is substantially the same as the hardness value of the inner core's geometric center (that is, the surface of the inner core has about the same hardness as the geometric center), the hardness gradient will be deemed "zero." For example, if the outer surface of the inner core and the geometric center of the inner core each has a hardness of 65 Shore C, then the inner core has a zero hardness gradient. Likewise, if the outer surface of the outer core layer has a hardness value approximately the same as the inner surface of the outer core layer, the outer core layer will be considered to have a zero hardness gradient.

More particularly, the term, "positive hardness gradient" as used herein means a hardness gradient of positive 3 Shore C or greater, preferably 7 Shore C or greater, more preferably 10 Shore C, and even more preferably 20 Shore C or greater. The term, "zero hardness gradient" as used herein means a hardness gradient of less than 3 Shore C, preferably less than 1 Shore C and may have a value of zero or negative 1 to negative 10 Shore C. The term, "negative hardness gradient" as used herein means a hardness value of less than zero, for example, negative 3, negative 5, negative 7, negative 10, negative 15, or negative 20 or negative 25. The terms, "zero hardness gradient" and "negative hardness gradient" may be used herein interchangeably to refer to hardness gradients of negative 1 to negative 10.

The inner core preferably has a geometric center hardness ($H_{inner\ core\ center}$) of about 5 Shore D or greater. For example, the ($H_{inner\ core\ center}$) may be in the range of about 5 to about 88 Shore D and more particularly within a range having a lower limit of about 5 or 10 or 18 or 20 or 26 or 30 or 34 or 36 or 38 or 42 or 48 or 50 or 52 Shore D and an upper limit of about 54 or 56 or 58 or 60 or 62 or 64 or 68 or 70 or 74 or 76 or 80 or 82 or 84 or 88 Shore D. In another example, the center hardness of the inner core ($H_{inner\ core\ center}$), as measured in Shore C units, is preferably about 10 Shore C or greater; for example, the $H_{inner\ core\ center}$ may have a lower limit of about 10 or 14 or 16 or 20 or 23 or 24 or 28 or 31 or 34 or 37 or 40 or 44 Shore C and an upper limit of about 46 or 48 or 50 or 51 or 53 or 55 or 58 or 61 or 62 or 65 or 68 or 71 or 74 or 76 or 78 or 79 or 80 or 84 or 90 Shore C. Concerning the outer surface hardness of the inner core ($H_{inner\ core\ surface}$), this hardness is preferably about 12 Shore D or greater; for example, the $H_{inner\ core\ surface}$ may fall within a range having a lower limit of about 12 or 15 or 18 or 20 or 22 or 26 or 30 or 34 or 36 or 38 or 42 or 48 or 50 or 52 Shore D and an upper limit of about 54 or 56 or 58 or 60 or 62 or 70 or 72 or 75 or 78 or 80 or 82 or 84 or 86 or 90 Shore D. In one version, the outer surface hardness of the inner core ($H_{inner\ core\ surface}$), as measured in Shore C units, has a lower limit of about 13 or 15 or 18 or 20 or 22 or 24 or 27 or 28 or 30 or 32 or 34 or 38 or 44 or 47 or 48 Shore C and an upper limit of about 50 or 54 or 56 or 61 or 65 or 66 or 68 or 70 or 73 or 76 or 78 or 80 or 84 or 86 or 88 or 90 or 92 Shore C. In another version, the geometric center hardness ($H_{inner\ core\ center}$) is in the range of about 10 Shore C to about 50 Shore C; and the outer surface hardness of the inner core ($H_{inner\ core\ surface}$) is in the range of about 5 Shore C to about 50 Shore C.

On the other hand, the outer core layer preferably has an outer surface hardness ($H_{outer\ surface\ of\ OC}$) of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The outer surface hardness of the outer core layer ($H_{outer\ surface\ of\ OC}$), as measured in Shore C units, preferably has a lower limit of about 40 or 42 or 45 or 48 or 50 or 54 or 58 or 60 or 63 or 65 or 67 or 720 or 72 or 73 or 76 Shore C, and an upper limit of about 78 or 80 or 84 or 87 or 88 or 89 or 90 or 92 or 95 Shore C. And, the inner surface of the outer core layer ($H_{inner\ surface\ of\ OC}$) preferably has a hardness of about 40 Shore D or greater, and more preferably within a range having a lower limit of about 40 or 42 or 44 or 46 or 48 or 50 or 52 and an upper limit of about 54 or 56 or 58 or 60 or 62 or 64 or 70 or 74 or 78 or 80 or 82 or 85 or 87 or 88 or 90 Shore D. The inner surface hardness of the outer core layer ($H_{inner\ surface\ of\ OC}$), as measured in Shore C units, preferably has a lower limit of about 40 or 42 or 44 or 45 or 47 or 50 or 52 or 54 or 55 or 58 or 60 or 63 or 65 or 67 or 70 or 73 or 76 Shore C, and an upper limit of about 78 or 80 or 85 or 88 or 89 or 90 or 92 or 95 Shore C.

In one embodiment, the outer surface hardness of the outer core layer ($H_{outer\ surface\ of\ OC}$), is less than the outer surface hardness ($H_{inner\ core\ surface}$) of the inner core by at least 3 Shore C units and more preferably by at least 5 Shore C.

In a second embodiment, the outer surface hardness of the outer core layer ($H_{outer\ surface\ of\ OC}$), is greater than the outer surface hardness ($H_{inner\ core\ surface}$) of the inner core by at least 3 Shore C units and more preferably by at least 5 Shore C.

As discussed above, the inner core is preferably formed from a foamed thermoplastic or thermoset composition and more preferably foamed polyurethanes. And, the outer core layer is formed preferably from a non-foamed thermoset composition such as polybutadiene rubber.

The core structure also has a hardness gradient across the entire core assembly. In one embodiment, the ($H_{inner\ core\ center}$) is in the range of about 10 Shore C to about 60 Shore C, preferably about 13 Shore C to about 55 Shore C; and the ($H_{outer\ surface\ of\ OC}$) is in the range of about 65 to about 96 Shore C, preferably about 68 Shore C to about 94 Shore C or about 75 Shore C to about 93 Shore C, to provide a positive hardness gradient across the core assembly. The gradient across the core assembly will vary based on several factors including, but not limited to, the dimensions of the inner core, intermediate core, and outer core layers.

The inner core preferably has a diameter in the range of about 0.100 to about 1.100 inches. For example, the inner core may have a diameter within a range of about 0.100 to about 0.500 inches. In another example, the inner core may have a diameter within a range of about 0.300 to about 0.800 inches. More particularly, the inner core may have a diameter size with a lower limit of about 0.10 or 0.12 or 0.15 or 0.25 or 0.30 or 0.35 or 0.45 or 0.55 inches and an upper limit of about 0.60 or 0.65 or 0.70 or 0.80 or 0.90 or 1.00 or 1.10 inches. As far as the outer core layer is concerned, it preferably has a thickness in the range of about 0.100 to about 0.750 inches. For example, the lower limit of thickness may be about 0.050 or 0.100 or 0.150 or 0.200 or 0.250 or 0.300 or 0.340 or 0.400 and the upper limit may be about 0.500 or 0.550 or 0.600 or 0.650 or 0.700 or 0.750 inches.

Dual-layered core structures containing layers with various thickness and volume levels may be made in accordance with this invention. For example, in one version, the total diameter of the core structure is 0.20 inches and the total volume of the core structure is 0.23 cc. More particularly, in this example, the diameter of the inner core is 0.10 inches and the volume of the inner core is 0.10 cc; while the thickness of the outer core is 0.100 inches and the volume of the outer core is 0.13 cc. In another version, the total core diameter is about 1.55 inches and the total core volume is 31.96 cc. In this version, the outer core layer has a thickness of 0.400 inches and volume of 28.34 cc. Meanwhile, the inner core has a diameter of 0.75 inches and volume of 3.62 cm. In one embodiment, the volume of the outer core layer is greater than the volume of the inner core. In another embodiment, the volume of the outer core layer and inner core are equivalent. In still another embodiment, the volume of the outer core layer is less than the volume of the inner core. Other examples of core structures containing layers of varying thicknesses and volumes are described below in Table A.

TABLE A

Sample Core Dimensions

| Example | Total Core Diameter | Total Core Volume | Thermoset Outer Core Thickness | Outer Core Volume | Foamed Inner Core Diameter | Volume of Inner Core |
|---------|---------------------|-------------------|--------------------------------|-------------------|----------------------------|----------------------|
| A | 0.30" | 0.23 cc | 0.100" | 0.13 cc | 0.10" | 0.10 cc |
| B | 1.60" | 33.15 cc | 0.750" | 33.05 cc | 0.10" | 0.10 cc |
| C | 1.55" | 31.96 cc | 0.225" | 11.42 cc | 1.10" | 11.42 cc |
| D | 1.55" | 31.96 cc | 0.400" | 28.34 cc | 0.75" | 3.62 cc |
| E | 1.55" | 31.96 cc | 0.525" | 28.34 cc | 0.50" | 3.62 cc |

In one preferred embodiment, the inner core has a specific gravity in the range of about 0.25 to about 1.25 g/cc. Also, as discussed above, the specific gravity of the inner core may vary at different points of the inner core structure. That is, there may be a specific gravity gradient in the inner core. For example, in one preferred version, the geometric center of the inner core has a density in the range of about 0.25 to about 0.75 g/cc; while the outer skin of the inner core has a density in the range of about 0.75 to about 1.50 g/cc.

Meanwhile, the outer core layer preferably has a relatively high specific gravity. Thus, the specific gravity of the inner core layer ($SG_{inner}$) is preferably less than the specific gravity of the outer core layer ($SG_{outer}$). By the term, "specific gravity of the outer core layer" ("$SG_{outer}$"), it is generally meant the specific gravity of the outer core layer as measured at any point of the outer core layer. The specific gravity values at different points in the outer core layer may vary. That is, there may be specific gravity gradients in the outer core layer similar to the inner core. For example, the outer core layer may have a specific gravity within a range having a lower limit of about 0.50 or 0.60 or 0.70 or 0.75 or 0.85 or 0.95 or 1.00 or 1.10 or 1.25 or 1.30 or 1.36 or 1.40 or 1.42 or 1.48 or 1.50 or 1.60 or 1.66 or 1.75 or 2.00 and an upper limit of 2.50 or 2.60 or 2.80 or 2.90 or 3.00 or 3.10 or 3.25 or 3.50 or 3.60 or 3.80 or 4.00, 4.25 or 5.00 or 5.10 or 5.20 or 5.30 or 5.40 or 6.00 or 6.20 or 6.25 or 6.30 or 6.40 or 6.50 or 7.00 or 7.10 or 7.25 or 7.50 or 7.60 or 7.65 or 7.80 or 8.00 or 8.20 or 8.50 or 9.00 or 9.75 or 10.00 g/cc.

In general, the specific gravities of the respective pieces of an object affect the Moment of Inertia (MOI) of the object. The Moment of Inertia of a ball (or other object) about a given axis generally refers to how difficult it is to change the ball's angular motion about that axis. If the ball's mass is concentrated towards the center (the center piece (for example, inner core) has a higher specific gravity than the outer piece (for example, outer core layers), less force is required to change its rotational rate, and the ball has a relatively low Moment of Inertia. In such balls, most of the mass is located close to the ball's axis of rotation and less force is needed to generate spin. Thus, the ball has a generally high spin rate as the ball leaves the club's face after making impact. Conversely, if the ball's mass is concentrated towards the outer surface (the outer piece (for example, outer core layers) has a higher specific gravity than the center piece (for example, inner core), more force is required to change its rotational rate, and the ball has a relatively high Moment of Inertia. That is, in such balls, most of the mass is located away from the ball's axis of rotation and more force is needed to generate spin. Such balls have a generally low spin rate as the ball leaves the club's face after making impact.

More particularly, as described in Sullivan, U.S. Pat. No. 6,494,795 and Ladd et al., U.S. Pat. No. 7,651,415, the formula for the Moment of Inertia for a sphere through any diameter is given in the CRC Standard Mathematical Tables, 24th Edition, 1976 at 20 (hereinafter CRC reference). The term, "specific gravity" as used herein, has its ordinary and customary meaning, that is, the ratio of the density of a substance to the density of water at 4° C., and the density of water at this temperature is 1 g/cm³.

In one embodiment, the golf balls of this invention are relatively low spin and long distance. That is, the foam core construction, as described above, wherein the inner core is made of a foamed composition helps provide a relatively low spin ball having good resiliency. The inner foam cores of this invention preferably have a Coefficient of Restitution (COR) of about 0.300 or greater; more preferably about 0.400 or greater, and even more preferably about 0.450 or greater. The resulting balls containing the dual-layered core constructions of this invention and cover of at least one layer preferably have a COR of about 0.700 or greater, more preferably about 0.730 or greater; and even more preferably about 0.750 to 0.810 or greater. The inner foam cores preferably have a Soft Center Deflection Index ("SCDI") compression, as described in the Test Methods below, in the range of about 50 to about 190, and more preferably in the range of about 60 to about 170.

The USGA has established a maximum weight of 45.93 g (1.62 ounces) for golf balls. For play outside of USGA rules, the golf balls can be heavier. In one preferred embodiment, the weight of the multi-layered core is in the range of about 28 to about 38 grams. Also, golf balls made in accordance with this invention can be of any size, although the USGA requires that golf balls used in competition have a diameter of at least 1.68 inches. For play outside of United States Golf Association (USGA) rules, the golf balls can be of a smaller size. Normally, golf balls are manufactured in accordance with USGA requirements and have a diameter in the range of about 1.68 to about 1.80 inches. As discussed further below, the golf ball contains a cover which may be multi-layered and in addition may contain intermediate (casing) layers, and the thickness levels of these layers also must be considered. Thus, in general, the dual-layer core structure normally has an overall diameter within a range having a lower limit of about 1.00 or 1.20 or 1.30 or 1.40 inches and an upper limit of about 1.58 or 1.60 or 1.62 or 1.66 inches, and more preferably in the range of about 1.3 to 1.65 inches. In one embodiment, the diameter of the core sub-assembly is in the range of about 1.45 to about 1.62 inches.

Cover Structure

The golf ball sub-assemblies of this invention may be enclosed with one or more cover layers. The golf ball sub-assembly may comprise the multi-layered core structure as discussed above. In other versions, the golf ball sub-assembly includes the core structure and one or more casing (mantle) layers disposed about the core. In one particularly preferred version, the golf ball includes a multi-layered cover comprising inner and outer cover layers. The inner cover layer is preferably formed from a composition comprising an ionomer or a blend of two or more ionomers that helps impart hardness to the ball. In a particular embodiment, the inner cover layer is formed from a composition comprising a high acid ionomer. A particularly suitable high acid ionomer is Surlyn 8150® (DuPont). Surlyn 8150® is a copolymer of ethylene and methacrylic acid, having an acid content of 19 wt %, which is 45% neutralized with sodium. In another particular embodiment, the inner cover layer is formed from a composition comprising a high acid ionomer and a maleic anhydride-grafted non-ionomeric polymer. A particularly suitable maleic anhydride-grafted polymer is Fusabond 525D® (DuPont). Fusabond 525D® is a maleic anhydride-grafted, metallocene-catalyzed ethylene-butene copolymer having about 0.9 wt % maleic anhydride grafted onto the copolymer. A particularly preferred blend of high acid ionomer and maleic anhydride-grafted polymer is an 84 wt %/16 wt % blend of Surlyn 8150® and Fusabond 525D®. Blends of high acid ionomers with maleic anhydride-grafted polymers are further disclosed, for example, in U.S. Pat. Nos. 6,992,135 and 6,677,401, the entire disclosures of which are hereby incorporated herein by reference.

The inner cover layer also may be formed from a composition comprising a 50/45/5 blend of Surlyn® 8940/Surlyn® 9650/Nucrel® 960, and, in a particularly preferred embodiment, the composition has a material hardness of from 80 to 85 Shore C. In yet another version, the inner cover layer is formed from a composition comprising a 50/25/25 blend of Surlyn® 8940/Surlyn® 9650/Surlyn® 9910, preferably having a material hardness of about 90 Shore C. The inner cover layer also may be formed from a composition comprising a 50/50 blend of Surlyn® 8940/Surlyn® 9650, preferably having a material hardness of about 86 Shore C. A composition comprising a 50/50 blend of Surlyn® 8940 and Surlyn® 7940 also may be used. Surlyn® 8940 is an E/MAA copolymer in which the MAA acid groups have been partially neutralized with sodium ions. Surlyn® 9650 and Surlyn® 9910 are two different grades of E/MAA copolymer in which the MAA acid groups have been partially neutralized with zinc ions. Nucrel® 960 is an E/MAA copolymer resin nominally made with 15 wt % methacrylic acid.

A wide variety of materials may be used for forming the outer cover including, for example, polyurethanes; polyureas; copolymers, blends and hybrids of polyurethane and polyurea; olefin-based copolymer ionomer resins (for example, Surlyn® ionomer resins and DuPont HPF® 1000 and HPF® 2000, commercially available from DuPont; Iotek® ionomers, commercially available from ExxonMobil Chemical Company; Amplify® IO ionomers of ethylene acrylic acid copolymers, commercially available from The Dow Chemical Company; and Clarix® ionomer resins, commercially available from A. Schulman Inc.); polyethylene, including, for example, low density polyethylene, linear low density polyethylene, and high density polyethylene; polypropylene; rubber-toughened olefin polymers; acid copolymers, for example, poly(meth)acrylic acid, which do not become part of an ionomeric copolymer; plastomers; flexomers; styrene/butadiene/styrene block copolymers; styrene/ethylene-butylene/styrene block copolymers; dynamically vulcanized elastomers; copolymers of ethylene and vinyl acetates; copolymers of ethylene and methyl acrylates; polyvinyl chloride resins; polyamides, poly(amide-ester) elastomers, and graft copolymers of ionomer and polyamide including, for example, Pebax® thermoplastic polyether block amides, commercially available from Arkema Inc; cross-linked trans-polyisoprene and blends thereof; polyester-based thermoplastic elastomers, such as Hytrel®, commercially available from DuPont or RiteFlex®, commercially available from Ticona Engineering Polymers; polyurethane-based thermoplastic elastomers, such as Elastollan®, commercially available from BASF; synthetic or natural vulcanized rubber; and combinations thereof. Castable polyurethanes, polyureas, and hybrids of polyurethanes-polyureas are particularly desirable because these materials can be used to make a golf ball having high resiliency and a soft feel. By the term, "hybrids of polyurethane and polyurea," it is meant to include copolymers and blends thereof.

Polyurethanes, polyureas, and blends, copolymers, and hybrids of polyurethane/polyurea are also particularly suitable for forming cover layers. When used as cover layer materials, polyurethanes and polyureas can be thermoset or thermoplastic. Thermoset materials can be formed into golf ball layers by conventional casting or reaction injection molding techniques. Thermoplastic materials can be formed into golf ball layers by conventional compression or injection molding techniques.

The compositions used to make the casing (mantle) and cover layers may contain a wide variety of fillers and additives to impart specific properties to the ball. For example, relatively heavy-weight and light-weight metal fillers such as, particulate; powders; flakes; and fibers of copper, steel, brass, tungsten, titanium, aluminum, magnesium, molybdenum, cobalt, nickel, iron, lead, tin, zinc, barium, bismuth, bronze, silver, gold, and platinum, and alloys and combinations thereof may be used to adjust the specific gravity of the ball. Other additives and fillers include, but are not limited to, optical brighteners, coloring agents, fluorescent agents, whitening agents, UV absorbers, light stabilizers, surfactants, processing aids, antioxidants, stabilizers, softening agents, fragrance components, plasticizers, impact modifiers, titanium dioxide, clay, mica, talc, glass flakes, milled glass, and mixtures thereof.

The inner cover layer preferably has a material hardness within a range having a lower limit of 70 or 75 or 80 or 82 Shore C and an upper limit of 85 or 86 or 90 or 92 Shore C. The thickness of the intermediate layer is preferably within a range having a lower limit of 0.010 or 0.015 or 0.020 or 0.030 inches and an upper limit of 0.035 or 0.045 or 0.080 or 0.120 inches. The outer cover layer preferably has a material hardness of 85 Shore C or less. The thickness of the outer cover layer is preferably within a range having a lower limit of 0.010 or 0.015 or 0.025 inches and an upper limit of 0.035 or 0.040 or 0.055 or 0.080 inches. Methods for measuring hardness of the layers in the golf ball are described in further detail below.

A single cover or, preferably, an inner cover layer is formed around the outer core layer. When an inner cover layer is present, an outer cover layer is formed over the inner cover layer. Most preferably, the inner cover is formed from an ionomeric material and the outer cover layer is formed from a polyurethane material, and the outer cover layer has a hardness that is less than that of the inner cover layer. Preferably, the inner cover has a hardness of greater than about 60 Shore D and the outer cover layer has a hardness of less than about 60 Shore D. In an alternative embodiment, the inner cover layer is comprised of a partially or fully neutralized ionomer, a thermoplastic polyester elastomer such as Hytrel™, commercially available form DuPont, a thermoplastic polyether block amide, such as Pebax™, commercially available from Arkema, Inc., or a thermoplastic or thermosetting polyurethane or polyurea, and the outer cover layer is comprised of an ionomeric material. In this alternative embodiment, the inner cover layer has a hardness of less than about 60 Shore D and the outer cover layer has a hardness of greater than about 55 Shore D and the inner cover layer hardness is less than the outer cover layer hardness.

As discussed above, the core structure of this invention may be enclosed with one or more cover layers. In one embodiment, a multi-layered cover comprising inner and outer cover layers is formed, where the inner cover layer has a thickness of about 0.01 inches to about 0.06 inches, more preferably about 0.015 inches to about 0.040 inches, and most preferably about 0.02 inches to about 0.035 inches. In this version, the inner cover layer is formed from a partially- or fully-neutralized ionomer having a Shore D hardness of greater than about 55, more preferably greater than about 60, and most preferably greater than about 65. The outer cover layer, in this embodiment, preferably has a thickness of about 0.015 inches to about 0.055 inches, more preferably about 0.02 inches to about 0.04 inches, and most preferably about 0.025 inches to about 0.035 inches, with a hardness of about Shore D 80 or less, more preferably 70 or less, and most preferably about 60 or less. The inner cover layer is harder than the outer cover layer in this version. A preferred outer cover layer is a castable or reaction injection molded polyurethane, polyurea or copolymer, blend, or hybrid thereof having a Shore D hardness of about 40 to about 50. In another multi-layer cover, dual-core embodiment, the outer cover and inner cover layer materials and thickness are the same but, the hardness range is reversed, that is, the outer cover layer is harder than the inner cover layer. For this harder outer cover/softer inner cover embodiment, the ionomer resins described above would preferably be used as outer cover material.

Manufacturing of Golf Balls

As described above, the inner core preferably is formed by a casting method. The outer core layer, which surrounds the inner core, is formed by molding compositions over the inner core. Compression or injection molding techniques may be used to form the other layers of the core sub-assembly. Then, the casing and/or cover layers are applied over the core sub-assembly. Prior to this step, the core structure may be surface-treated to increase the adhesion between its outer surface and the next layer that will be applied over the core. Such surface-treatment may include mechanically or chemically-abrading the outer surface of the core. For example, the core may be subjected to corona-discharge, plasma-treatment, silane-dipping, or other treatment methods known to those in the art.

The cover layers are formed over the core or ball sub-assembly (the core structure and any casing layers disposed about the core) using a suitable technique such as, for example, compression-molding, flip-molding, injection-molding, retractable pin injection-molding, reaction injection-molding (RIM), liquid injection-molding, casting, spraying, powder-coating, vacuum-forming, flow-coating, dipping, spin-coating, and the like. Preferably, each cover layer is separately formed over the ball subassembly. For example, an ethylene acid copolymer ionomer composition may be injection-molded to produce half-shells. Alternatively, the ionomer composition can be placed into a compression mold and molded under sufficient pressure, temperature, and time to produce the hemispherical shells. The smooth-surfaced hemispherical shells are then placed around the core sub-assembly in a compression mold. Under sufficient heating and pressure, the shells fuse together to form an inner cover layer that surrounds the sub-assembly. In another method, the ionomer composition is injection-molded directly onto the core sub-assembly using retractable pin injection molding. An outer cover layer comprising a polyurethane or polyurea composition over the ball sub-assembly may be formed by using a casting process.

After the golf balls have been removed from the mold, they may be subjected to finishing steps such as flash-trimming, surface-treatment, marking, coating, and the like using techniques known in the art. For example, in traditional white-colored golf balls, the white-pigmented cover may be surface-treated using a suitable method such as, for example, corona, plasma, or ultraviolet (UV) light-treatment. Then, indicia such as trademarks, symbols, logos, letters, and the like may be printed on the ball's cover using pad-printing, ink-jet printing, dye-sublimation, or other suitable printing methods. Clear surface coatings (for example, primer and top-coats), which may contain a fluorescent whitening agent, are applied to the cover. The resulting golf ball has a glossy and durable surface finish.

In another finishing process, the golf balls are painted with one or more paint coatings. For example, white primer paint may be applied first to the surface of the ball and then a white top-coat of paint may be applied over the primer. Of course, the golf ball may be painted with other colors, for example, red, blue, orange, and yellow. As noted above, markings such as trademarks and logos may be applied to the painted cover of the golf ball. Finally, a clear surface coating may be applied to the cover to provide a shiny appearance and protect any logos and other markings printed on the ball.

Different ball constructions can be made using the core construction of this invention as shown in FIGS. 3 and 4. Such golf ball constructions include, for example, five-piece, and six-piece constructions. It should be understood that the golf balls shown in FIGS. 3 and 4 are for illustrative purposes only, and they are not meant to be restrictive. Other golf ball constructions can be made in accordance with this invention.

Cores Having Three Layers

For example, multi-layered cores having an inner core, intermediate core layer, and outer core layer, wherein the intermediate core layer is disposed between the intermediate and outer core layers may be prepared in accordance with this invention. More particularly, as discussed above, the inner core may be constructed from a foamed composition, preferably foamed polyurethane. Meanwhile, the intermediate and outer core layers may be formed from non-foamed thermoset or thermoplastic materials. Suitable thermoset and thermoplastic compositions that may be used to form the intermediate/outer core layers are discussed above. For example, each of the intermediate and outer core layers may be formed from a thermoset rubber composition. Thus, the intermediate core layer may be formed from a first thermoset rubber composition; and the outer core layer may be formed from a second thermoset rubber composition. In another embodiment, the intermediate core layer is formed from a non-foamed thermoset composition; and the outer core layer is formed from a non-foamed thermoplastic composition. In a third embodiment, the intermediate core layer is formed from a non-foamed thermoplastic composition; and the outer core layer is formed from a non-foamed thermoset composition. Finally, in a fourth embodiment, the intermediate core layer is formed from a first non-foamed thermoplastic composition; and the outer core layer is formed from a second non-foamed thermoplastic compositions.

The above-discussed thermoset and thermoplastic compositions may be used to form the intermediate and outer core layers. In one embodiment, the specific gravity of the inner core (foamed composition) is less than the specific gravity of the intermediate and outer core layers. The specific gravities of the intermediate and outer core layers may be the same or different. In one version, the specific gravity of the intermediate core layer is greater than the specific gravity of the outer core layer. In another version, the specific gravity of the outer core is greater than the specific gravity of the intermediate core layer.

Cores Having Two or More Foam Layers

In another example, cores having two or more layers comprising foamed compositions may be made in accordance with this invention. In one embodiment, a dual-core structure having an inner core layer comprising a first foamed polyurethane composition, and an outer core layer comprising a second foamed polyurethane composition is made. The inner core layer preferably has a diameter in the range of about 0.100 to about 1.100 inches and the outer core layer preferably has a thickness in the range of about 0.100 to about 0.750 inches. The specific gravity of the outer core ($SG_{outer}$) is preferably greater than the specific gravity of the inner core ($SG_{inner}$). Alternatively, the inner core may have a greater specific gravity than the outer core's specific gravity. In yet another version, the specific gravities of the inner and outer core layers are substantially equivalent. Furthermore, the inner cover layer, which surrounds the core sub-assembly, may be foamed or non-foamed. Suitable thermoset and thermoplastic compositions that may be used to form the foam compositions for constructing the different core layers are discussed above.

Where more than one foam layer is used in a single golf ball, the respective foamed chemical compositions may be the same or different, and the compositions may have the same or different hardness or specific gravity levels. For example, a golf ball may contain a dual-core having a foamed polyurethane center with a specific gravity of about 0.40 g/cc and a geometric center hardness of about 50 Shore C and a center surface hardness of about 75 Shore C. Meanwhile, the outer core layer may be made from a foamed highly-neutralized ionomer (HNP) composition, wherein the outer core layer has a specific gravity of about 0.80 g/cc and a surface hardness of about 80 Shore C.

In another example, a golf ball having a foamed center made of a foamed polyurethane composition and a surrounding outer core layer made of a foamed highly-neutralized ionomer (HNP) may be made. In one embodiment, the foamed center has a specific gravity of about 0.40 g/cc, and the foamed outer core layer has a specific gravity of about 0.80 g/cc. In a third example, a polyurethane foam center (0.50 inch diameter) is encased in a HNP foam outer core layer (0.06 inch thickness). The inner foamed polyurethane core has a specific gravity of 0.5 g/cc and a surface hardness of 80 Shore C, while the outer foamed HNP core has a specific gravity of 0.90 g/cc and a surface hardness of 70 Shore C. The dual-core is enclosed in a dual-cover, wherein the inner cover is made of a relatively hard ionomer composition (for example, a 50/50 blend of Surlyn® 7940 and Surlyn® 8940 or a 50/50 blend of Surlyn® 9910/Surlyn® 8940) preferably having a thickness of 0.06 inches and an outer cover made of a relatively soft polyurethane composition preferably having a thickness of 0.03 inches.

In a fourth example, a rigid foam outer core layer comprising a thermoset polyurethane foam composition is molded over an inner core (center) comprising a HNP foam composition to provide a "hard over soft" dual-core that reduces ball spin and increases ball distance. In this example, the HNP foam center has a diameter of about 0.50 to about 0.80 inches, and the outer core layer of cast, thermoset foam has an outer diameter of about 1.30 to about 1.58 inches. The dual-core is enclosed in a dual-cover, wherein the inner cover is made of a relatively hard ionomer composition (for example, a 50/50 blend of Surlyn® 7940 and Surlyn® 8940 or a 50/50 blend of Surlyn® 9910/Surlyn® 8940) preferably having a thickness of 0.06 inches and an outer cover made of a relatively soft polyurethane composition preferably having a thickness of 0.03 inches. In this embodiment, either the inner cover comprising the ionomer blend or the outer cover comprising the polyurethane preferably contains a sufficient amount of heavy filler to adjust the weight of the golf ball so that it is at least 44 grams, preferably 45.0 to 45.9 grams. In an alternative embodiment, a relatively soft polyurethane foam composition is used to form the inner core (center) as opposed to the foamed HNP composition. The soft polyurethane foam material used to form the inner core preferably has a different chemical composition than the soft polyurethane material used to form the outer cover.

Furthermore, multi-layered cores having an inner core, intermediate core layer, and outer core layer (as discussed above) may be made, wherein at least two of the layers comprise foamed compositions. The core may have adjoining foam layers, for example, the inner core and intermediate core layers may be made of foamed polyurethane compositions, while the outer core layer may be made of a non-foamed thermoset or thermoplastic composition. For example, a polybutadiene foamed center (0.50 inch diameter) is encased in a partially-neutralized ionomer foamed intermediate core layer (0.050 inch thickness). The inner foamed polybutadiene core may have a specific gravity of 0.85 g/cc and a surface hardness of 65 Shore C, while the partially-neutralized ionomer foamed intermediate core layer may have a specific gravity of 0.70 g/cc and a surface hardness of 85 Shore C. An outer core layer made of a relative hard HNP ionomer composition having a specific gravity of 0.70 g/cc and a surface hardness of 85 Shore C surrounds the intermediate core layer. The three-layered core structure ("triple core") is enclosed in a dual-cover, wherein the inner cover is made of a relatively hard ionomer composition and an outer cover made of a relatively soft polyurethane composition.

In an alternative version, the core may have a non-foamed thermoset or thermoplastic layer disposed between two foam layers. For example, the inner and outer core layers may be made of a foamed polyurethane composition, and these layers may form a sandwich around an intermediate core layer made of a non-foamed thermoset or thermoplastic composition such as polybutadiene rubber.

In the above core sub-assembly constructions, any of the foamed or non-foamed compositions may further comprises nanoclay particulate, preferably in an amount of about 0.1 to about 9.0% by weight based on weight of composition.

Test Methods

Hardness. The center hardness of a core is obtained according to the following procedure. The core is gently pressed into a hemispherical holder having an internal diameter approximately slightly smaller than the diameter of the core, such that the core is held in place in the hemispherical portion of the holder while concurrently leaving the geometric central plane of the core exposed. The core is secured in the holder by friction, such that it will not move during the cutting and grinding steps, but the friction is not so excessive that distortion of the natural shape of the core would result. The core is secured such that the parting line of the core is roughly parallel to the top of the holder. The diameter of the core is measured 90 degrees to this orientation prior to securing. A measurement is also made from the bottom of the holder to the top of the core to provide a reference point for future calculations. A rough cut is made slightly above the exposed geometric center of the core using a band saw or other appropriate cutting tool, making sure that the core does not move in the holder during this step. The remainder of the core, still in the holder, is secured to the base plate of a surface grinding machine. The exposed 'rough' surface is ground to a smooth, flat surface, revealing the geometric center of the core, which can be verified by measuring the height from the bottom of the holder to the exposed surface of the core, making sure that exactly half of the original height of the core, as measured above, has been removed to within 0.004 inches. Leaving the core in the holder, the center of the core is found with a center square and carefully marked and the hardness is measured at the center mark according to ASTM D-2240. Additional hardness measurements at any distance from the center of the core can then be made by drawing a line radially outward from the center mark, and measuring the hardness at any given distance along the line, typically in 2 mm increments from the center. The hardness at a particular distance from the center should be measured along at least two, preferably four, radial arms located 180° apart, or 90° apart, respectively, and then averaged. All hardness measurements performed on a plane passing through the geometric center are performed while the core is still in the holder and without having disturbed its orientation, such that the test surface is constantly parallel to the bottom of the holder, and thus also parallel to the properly aligned foot of the durometer.

The outer surface hardness of a golf ball layer is measured on the actual outer surface of the layer and is obtained from the average of a number of measurements taken from opposing hemispheres, taking care to avoid making measurements on the parting line of the core or on surface defects, such as holes or protrusions. Hardness measurements are made pursuant to ASTM D-2240 "Indentation Hardness of Rubber and Plastic by Means of a Durometer." Because of the curved surface, care must be taken to ensure that the golf ball or golf ball sub-assembly is centered under the durometer indenter before a surface hardness reading is obtained. A calibrated, digital durometer, capable of reading to 0.1 hardness units is used for the hardness measurements. The digital durometer must be attached to, and its foot made parallel to, the base of an automatic stand. The weight on the durometer and attack rate conforms to ASTM D-2240.

In certain embodiments, a point or plurality of points measured along the "positive" or "negative" gradients may be above or below a line fit through the gradient and its outermost and innermost hardness values. In an alternative preferred embodiment, the hardest point along a particular steep "positive" or "negative" gradient may be higher than the value at the innermost portion of the inner core (the geometric center) or outer core layer (the inner surface)—as long as the outermost point (i.e., the outer surface of the inner core) is greater than (for "positive") or lower than (for "negative") the innermost point (i.e., the geometric center of the inner core or the inner surface of the outer core layer), such that the "positive" and "negative" gradients remain intact.

As discussed above, the direction of the hardness gradient of a golf ball layer is defined by the difference in hardness measurements taken at the outer and inner surfaces of a particular layer. The center hardness of an inner core and hardness of the outer surface of an inner core in a single-core ball or outer core layer are readily determined according to the test procedures provided above. The outer surface of the inner core layer (or other optional intermediate core layers) in a dual-core ball are also readily determined according to the procedures given herein for measuring the outer surface hardness of a golf ball layer, if the measurement is made prior to surrounding the layer with an additional core layer. Once an additional core layer surrounds a layer of interest, the hardness of the inner and outer surfaces of any inner or intermediate layers can be difficult to determine. Therefore, for purposes of the present invention, when the hardness of the inner or outer surface of a core layer is needed after the inner layer has been surrounded with another core layer, the test procedure described above for measuring a point located 1 mm from an interface is used.

Also, it should be understood that there is a fundamental difference between "material hardness" and "hardness as measured directly on a golf ball." For purposes of the present invention, material hardness is measured according to ASTM D2240 and generally involves measuring the hardness of a flat "slab" or "button" formed of the material. Surface hardness as measured directly on a golf ball (or other spherical surface) typically results in a different hardness value. The difference in "surface hardness" and "material hardness" values is due to several factors including, but not limited to, ball construction (that is, core type, number of cores and/or cover layers, and the like); ball (or sphere) diameter; and the material composition of adjacent layers. It also should be understood that the two measurement techniques are not linearly related and, therefore, one hardness value cannot easily be correlated to the other. Shore hardness (for example, Shore C or Shore D hardness) was measured according to the test method ASTM D-2240.

Compression. As disclosed in Jeff Dalton's Compression by Any Other Name, Science and Golf IV, Proceedings of the World Scientific Congress of Golf (Eric Thain ed., Routledge, 2002) ("J. Dalton"), several different methods can be used to measure compression, including Atti compression, Riehle compression, load/deflection measurements at a variety of fixed loads and offsets, and effective modulus. For purposes of the present invention, compression refers to Soft Center Deflection Index ("SCDI"). The SCDI is a program change for the Dynamic Compression Machine ("DCM") that allows determination of the pounds required to deflect a core 10% of its diameter. The DCM is an apparatus that applies a load to a core or ball and measures the number of inches the core or ball is deflected at measured loads. A crude load/deflection curve is generated that is fit to the Atti compression scale that results in a number being generated that represents an Atti compression. The DCM does this via a load cell attached to the bottom of a hydraulic cylinder that is triggered pneumatically at a fixed rate (typically about 1.0 ft/s) towards a stationary core. Attached to the cylinder is an LVDT that measures the distance the cylinder travels during the testing timeframe. A software-based logarithmic algorithm ensures that measurements are not taken until at least five successive increases in load are detected during the initial phase of the test. The SCDI is a slight variation of this set up. The hardware is the same, but the software and output has changed. With the SCDI, the interest is in the pounds of force required to deflect a core x amount of inches. That amount of deflection is 10% percent of the core diameter. The DCM is triggered, the cylinder deflects the core by 10% of its diameter, and the DCM reports back the pounds of force required (as measured from the attached load cell) to deflect the core by that amount. The value displayed is a single number in units of pounds.

Drop Rebound. By "drop rebound," it is meant the number of inches a sphere will rebound when dropped from a height of 72 inches in this case, measuring from the bottom of the sphere. A scale, in inches is mounted directly behind the path of the dropped sphere and the sphere is dropped onto a heavy, hard base such as a slab of marble or granite (typically about 1 ft wide by 1 ft high by 1 ft deep). The test is carried out at about 72-75° F. and about 50% RH Coefficient of Restitution ("COR"). The COR is determined according to a known procedure, wherein a golf ball or golf ball sub-assembly (for example, a golf ball core) is fired from an air cannon at two given velocities and a velocity of 125 ft/s is used for the calculations. Ballistic light screens are located between the air cannon and steel plate at a fixed distance to measure ball velocity. As the ball travels toward the steel plate, it activates each light screen and the ball's time period at each light screen is measured. This provides an incoming transit time period which is inversely proportional to the ball's incoming velocity. The ball makes impact with the steel plate and rebounds so it passes again through the light screens. As the rebounding ball activates each light screen, the ball's time period at each screen is measured. This provides an outgoing transit time period which is inversely proportional to the ball's outgoing velocity. The COR is then calculated as the ratio of the ball's outgoing transit time period to the ball's incoming transit time period ($COR = V_{out}/V_{in} = T_{in}/T_{out}$).

Density. The density refers to the weight per unit volume (typically, $g/cm^3$) of the material and can be measured per ASTM D-1622.

EXAMPLES

The present invention is illustrated further by the following Examples, but these Examples should not be construed as limiting the scope of the invention.

In the following Examples, different foam formulations were used to prepare core samples using the above-described molding methods. The different formulations are described in Tables 1-5 below. The concentrations of ingredients in the formulations are in weight percent, based on total weight of the composition, unless otherwise indicated. The resulting spherical cores were measured for density and tested for compression and Coefficient of Restitution (COR) using the test methods as described above and the results are reported in Tables 1-5 below.

TABLE 1

Spherical Foam Core Samples

| Example No. | 1 | 2 | 3 | 4 | 5 | 6 |
|---|---|---|---|---|---|---|
| 6.5% MDI Prepolymer | 41 | 43.72 | 45.01 | 33.58 | 49.48 | 31.83 |
| Mondur MR | | | 7.33 | | | 13.64 |
| Mondur CD | 19.75 | | | | | |
| Mondur ML | | 17 | | 13.06 | 8.06 | |
| Poly THF 650 | | | 22.2 | | 13.06 | 29.01 |
| CAPA 3031 | 13.77 | 13.77 | | | 4 | |
| CAPA 3091 | | | | 27.86 | | |
| CAPA 4101 | | | | | | |
| CAPA 4801 | | | | | | |
| D.I. Water | 0.5 | 0.50 | 0.45 | 0.50 | 0.45 | 0.50 |
| Niax 1500 | 0.75 | 0.75 | 0.75 | 0.75 | | 0.75 |
| Varox MPBC | | | | | | |
| Irganox 1135 | | | | | | |
| Dabco 33LV | 0.2 | 0.2 | 0.2 | 0.2 | | 0.2 |
| Garamite 1958 | 0.375 | 0.375 | 0.375 | 0.375 | 0.375 | 0.375 |
| Total Parts | 76.345 | 76.315 | 76.315 | 76.325 | 75.05 | 76.305 |
| Density | 0.54 | 0.7 | 0.6 | 0.53 | 0.6 | |
| Compression | 35 | 106 | −217 | −242 | −217 | |
| CoR @125 ft/s | 0.434 | 0.503 | 0.52 | 0.278 | 0.41 | |

6.5% MDI Prepolymer is made from 4,4'-MDI and polytetramethylene glycol ether
Mondur™ MR-polymeric MDI, available from Bayer.
Mondur™ CD-modified 4,4'-MDI, available from Bayer.
Mondur™ ML-isomer mixture of 2,4 and 4,4'-MDI, available from Bayer.
Poly THF™ 650-650 molecular weight polyetratmethylene ether glycol (PTMEG), available from BASF.
CAPA™ 3031-low molecular weight trifunctional polycaprolactone polyol, available from Perstorp
CAPA™ 3091-polyester triol terminated by primary hydroxyl groups, available from Perstorp.
CAPA™ 4101-tetra-functional polyol terminated with primary hydroxyl groups, available from Perstorp.
CAPA™ 4801-tetra-functional polyol terminated with primary hydroxyl groups, available from Perstorp.
Niax™ L-1500-silicone surfactant from Momentive Specialty Chemicals, Inc.
Vanox™ MBPC-antioxidant, available from R. T. Vanderbuilt.
Irganox™ 1135-antioxidant, available BASF.
Dabco™ 33LV-tertiary amine catalyst, available from Air Products.
Garamite™ 1958-mixed mineral thixotropes (clay mixture), available from Southern Clay Products, Inc..

TABLE 2

Spherical Foam Core Samples

| Example No. | 7 | 8 | 9 | 10 | 11 | 12 |
|---|---|---|---|---|---|---|
| 6.5% MDI Prepolymer | 21.67 | 45.81 | 49.22 | 45.01 | 45.01 | 55.8 |
| Mondur MR | 18.46 | 7.46 | 8.01 | 7.33 | 7.33 | 9.08 |
| Mondur CD | | | | | | |
| Mondur ML | | | | | | |

TABLE 2-continued

Spherical Foam Core Samples

| Example No. | 7 | 8 | 9 | 10 | 11 | 12 |
|---|---|---|---|---|---|---|
| Poly THF 650 | 34.33 | 20.57 | 13 | 22.2 | 22.2 | |
| CAPA 3031 | | 0.7 | 4 | | | 9.66 |
| CAPA 3091 | | | | | | |
| CAPA 4101 | | | | | | |
| CAPA 4801 | | | | | | |
| D.I. Water | 0.53 | 0.45 | 0.45 | 0.45 | 0.45 | 0.45 |
| Niax 1500 | 0.75 | 0.75 | 0.75 | 0.75 | 0.75 | 0.75 |
| Varox MPBC | | | | 0.375 | | |
| Irganox 1135 | | | | | 0.38 | |
| Dabco 33LV | 0.2 | 0.2 | 0.2 | 0.2 | 0.2 | 0.2 |
| Garamite 1958 | 0.375 | 0.375 | 0.375 | 0.375 | 0.375 | 0.375 |
| Total Parts | 76.315 | 76.315 | 76.005 | 76.69 | 76.695 | 76.315 |
| Density | 0.46 | | | | | 0.4 |
| Compression | −245 | | | | | −109 |
| CoR @125 ft/s | 0.388 | | | | | 0.515 |

TABLE 3

Spherical Foam Core Samples

| Example No. | 13 | 14 | 15 | 16 | 17 | 18 |
|---|---|---|---|---|---|---|
| 6.5% MDI Prepolymer | 68.81 | 44.28 | 33.1 | 42.39 | 49.48 | 40.75 |
| Mondur MR | | 12.49 | 17.05 | 11.96 | 8.06 | 11.5 |
| Mondur CD | | | | | | |
| Mondur ML | | | | | | |
| Poly THF 650 | | | | | | |
| CAPA 3031 | 5.79 | 5.047 | 2.86 | 2.37 | 2 | |
| CAPA 3091 | | | | | | |
| CAPA 4101 | | 12.67 | 21.48 | 17.79 | 15 | 22.27 |
| CAPA 4801 | | | | | | |
| D.I. Water | 0.39 | 0.45 | 0.67 | 0.48 | 0.45 | 0.48 |
| Niax 1500 | 0.75 | 0.75 | 0.75 | 0.75 | 0.75 | 0.75 |
| Varox MPBC | | | | | | |
| Irganox 1135 | | | | | | |
| Dabco 33LV | 0.2 | 0.2 | 0.2 | 0.2 | 0.2 | 0.2 |
| Garamite 1958 | 0.375 | 0.375 | 0.38 | 0.38 | 0.38 | 0.38 |
| Total Parts | 76.315 | 76.262 | 76.49 | 76.32 | 76.32 | 76.33 |
| Density | 0.52 | 0.35 | 0.64 | 0.39 | 0.46 | 0.39 |
| Compression | −200 | −144 | 45 | −135 | −165 | −120 |
| CoR @125 ft/s | 0.54 | 0.534 | 0.571 | 0.553 | 0.537 | 0.543 |

TABLE 4

Spherical Foam Core Samples

| Example No. | 19 | 20 | 21 | 22 |
|---|---|---|---|---|
| 6.5% MDI Prepolymer | 47.83 | 56.05 | 29.18 | 19.58 |
| Mondur MR | 7.78 | 9.12 | 12.51 | 16.68 |
| Mondur CD | | | | |
| Mondur ML | | | | |
| Poly THF 650 | | | | |
| CAPA 3031 | | | | |
| CAPA 3091 | | | | |
| CAPA 4101 | 18.92 | 18.11 | 17.37 | 20.23 |
| CAPA 4801 | | 16.1 | 15.44 | 17.98 |
| D.I. Water | 0.45 | 0.61 | 0.5 | 0.52 |
| Niax 1500 | 0.75 | 0.75 | 0.75 | 0.75 |
| Varox MPBC | | | | |
| Irganox 1135 | | | | |
| Dabco 33LV | 0.2 | 0.2 | 0.2 | 0.2 |
| Garamite 1958 | 0.38 | 0.38 | 0.38 | 0.38 |
| Total Parts | 76.31 | 101.32 | 76.33 | 76.32 |
| Density | 0.42 | 0.66 | | 0.51 |
| Compression | −165 | −169 | | −100 |
| CoR @ 125 ft/s | 0.609 | 0.492 | | 0.425 |

TABLE 5

Spherical Foam Core Samples

| Example No. | 23 | 24 | 25 | 26 |
|---|---|---|---|---|
| 6.5% MDI Prepolymer | 43.87 | 50.63 | 37.21 | 43.57 |
| Mondur MR | 9.63 | 5.63 | 13.07 | 9.56 |
| Mondur CD | | | | |
| Mondur ML | | | | |
| Poly THF 650 | | | | |
| CAPA 3031 | | | | |
| CAPA 3091 | | | | |
| CAPA 4101 | 18.36 | 15.98 | 21.18 | 16.15 |
| CAPA 4801 | | | | |
| D.I. Water | 0.47 | 0.45 | 0.49 | 0.47 |
| Niax 1500 | 0.75 | 0.75 | 0.75 | 0.75 |
| Varox MPBC | | | | |
| Irganox 1135 | | | | |
| Dabco 33LV | 0.2 | 0.2 | 0.2 | 0.2 |
| Garamite 1958 | 0.38 | 0.38 | 0.38 | 0.38 |
| Total Parts | 76.31 | 76.33 | 76.34 | 76.33 |
| Density | 0.46 | 0.57 | 0.43 | 0.48 |
| Compression | −164 | −169 | −137 | −147 |
| CoR @ 125 ft/s | 0.578 | 0.600 | 0.541 | 0.571 |

In the following Examples (Samples A to D), different formulations were used to prepare dual-core samples having a foam center and surrounding thermoset outer core layer using the above-described molding methods. The sample cores were tested for compression (DCM), Coefficient of Restitution (COR), and hardness using the above-described test methods and the results are reported below in Table 10. In the formulations, the concentrations are in parts per hundred (phr) unless otherwise indicated. As used herein, the term "parts per hundred," also known as "phr," is defined as the number of parts by weight of a particular component present in a mixture, relative to 100 parts by weight of the base rubber component. Mathematically, this can be expressed as the weight of an ingredient divided by the total weight of the polymer, multiplied by a factor of 100.

Sample A (0.5" Foamed Center)

In this Sample, the foam formulation in below Table 6 was used to prepare an inner core having a diameter of 0.5 inches.

TABLE 6

Foam Center of Sample A

| Ingredient | Parts |
|---|---|
| 6.5% MDI Prepolymer | 45.010 |
| Mondur ™ 582 (2.5 fn) | 7.330 |
| Poly THF ™ 650 | 22.200 |
| Deionized Water | 0.450 |
| Niax ™ L-1500 surfactant | 0.750 |
| Dabco ™ 33LV | 0.200 |
| Garamite ™ 1958 | 0.375 |

The following rubber formulation (Table 7) was molded about the foamed inner core and cured to form a thermoset rubber outer core layer.

TABLE 7

(Rubber Outer Core Layer of Sample A)

| Ingredient | Parts |
|---|---|
| *Buna ™ CB23 | 100.0 |
| Zinc Diacrylate (ZDA) | 35.0 |
| **Perkadox BC | 0.5 |
| Zinc Pentachlorothiophenol (ZnPCTP) | 0.5 |
| Zinc Oxide | 14.9 |

*Buna ™ CB23 - polybutadiene rubber, available from Lanxess Corp.
**Perkadox ™ BC, peroxide free-radical initiator, available from Akzo Nobel.

Figure 5:
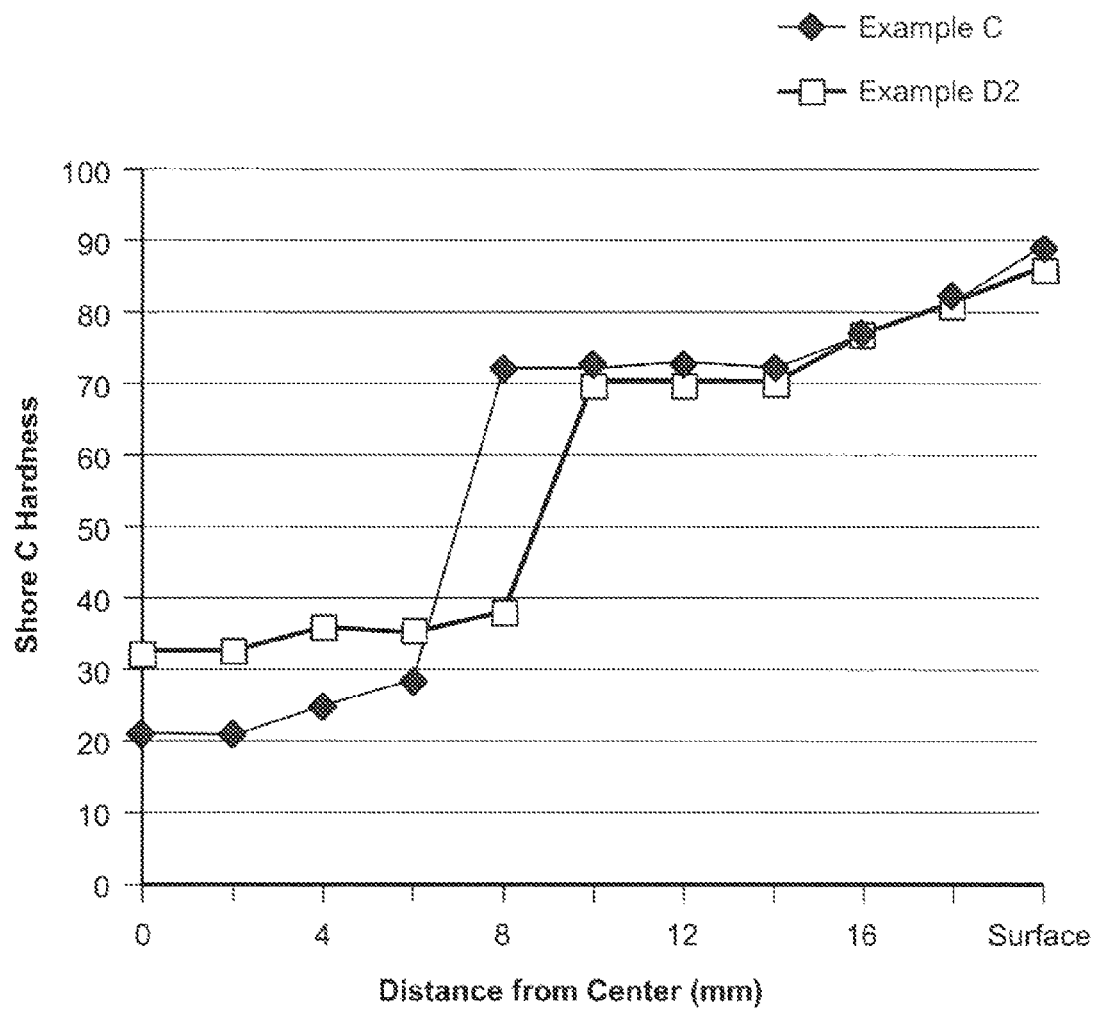
FIG. 5 is a graph showing the hardness of a two (2) different dual-layered core samples (each sample having a foam center and thermoset rubber outer layer) at different points in the respective core structures per two examples of this invention.

The dual-layered core of Sample A (foam center and thermoset rubber outer core layer with a center diameter of 0.5) inches was tested for hardness and the core was found to have a hardness gradient (across the entire core as measured at points in millimeters (mm) from the geometric center) in the range of about 21 Shore C to about 89 Shore C. The hardness of the core measured at the geometric center was about 21 Shore C and the hardness of the core measured at about 20 mm from the geometric center (that is, the surface of the outer core layer) was about 89 Shore C. The hardness values measured at various points along this core structure are described in Table 14 below and the hardness plot is shown in FIG. 5.

Sample B (0.5" Foamed Center)

In this Sample B, the foam formulation in below Table 8 was used to prepare an inner core having a diameter of 0.5 inches.

TABLE 8

(Foam Center of Sample B)

| Ingredient | Parts |
|---|---|
| 6.5% MDI Prepolymer | 55.800 |
| Mondur ™ 582 (2.5 fn) | 9.080 |
| CAPA ™ 3031 | 9.660 |
| Deionized Water | 0.450 |
| Niax ™ L-1500 surfactant | 0.750 |
| Dabco ™ 33LV | 0.200 |
| Garamite ™ 1958 | 0.375 |

The same rubber formulation as described above in Sample A (Table 7) was molded about the foam center of Sample B and cured to form a thermoset rubber outer core layer.

Sample C (0.5" Foamed Center)

In this Sample C, the foam formulation in below Table 9 was used to prepare an inner core having a diameter of 0.5 inches.

TABLE 9

(Foam Center of Sample C)

| Ingredient | Parts |
|---|---|
| 6.5% MDI Prepolymer | 44.280 |
| Mondur ™ 582 (2.5 fn) | 12.490 |
| CAPA ™ 3031 | 5.047 |
| Deionized Water | 0.450 |
| Niax ™ L-1500 surfactant | 0.750 |
| Dabco ™ 33LV | 0.200 |
| Garamite ™ 1958 | 0.375 |

The same rubber formulation as described above in Sample A (Table 7) was molded about the foam center of Sample C and cured to form a thermoset rubber outer core layer.

TABLE 10

Properties of Core Samples (A-C)

| Sample | Compression (DCM) | COR @ 125 ft/sec | Surface Hardness | Center Hardness | Hardness Gradient |
|---|---|---|---|---|---|
| A | 85 | 0.816 | 88.9 | 22.1 | 66.8 |
| B | 81 | 0.797 | 86.1 | 46.0 | 40.2 |
| C | 81 | 0.806 | 87.0 | 43.7 | 43.3 |

Sample D (0.75" Foamed Center)

In this Sample, the foam formulation in below Table 11 was used to prepare an inner core having a diameter of 0.75 inches.

TABLE 11

(Foam Center of Sample D)

| Ingredient | Parts |
|---|---|
| 6.5% MDI Prepolymer | 47.830 |
| Mondur ™ 582 (2.5 fn) | 7.780 |
| CAPA ™ 4101 | 18.920 |
| Deionized Water | 0.450 |
| Niax ™ L-1500 surfactant | 0.750 |
| Dabco ™ 33LV | 0.200 |
| Garamite ™ 1958 | 0.380 |

In this Sample D, the following rubber formulation (Table 12) was molded about the foamed inner core and cured to form a thermoset rubber outer core layer. Different core samples having different densities (Samples D1-D5) were prepared and are further described in Table 12 below.

TABLE 12

(Rubber Outer Core Layer of Sample D)

| Ingredient | Parts |
|---|---|
| Buna ™ CB23 | 100.0 |
| Zinc Diacrylate (ZDA) | 36.0 |
| Perkadox BC | 0.5 |
| Zinc Pentachlorothiophenol (ZnPCTP) | 0.5 |
| Zinc Oxide | 21.3 |

The Sample D1-D5 cores were tested for compression (DCM), Coefficient of Restitution (COR), and Hardness using the above-described test methods and the results are reported below in Table 13.

TABLE 13

Properties of Core Samples (D1-D5)

| Sample | Density of Foamed Center (g/cm³) | Compression (DCM) | COR@125ft/sec | Surface Hardness (Shore C) | Center Hardness (Shore C) | Hardness Gradient (Shore C) |
|---|---|---|---|---|---|---|
| D-1 | 0.40 | 80 | 0.779 | 86.6 | 33.5 | 53.0 |
| D-2 | 0.46 | 78 | 0.775 | 86.4 | 31.8 | 54.3 |
| D-3 | 0.59 | 77 | 0.770 | 86.4 | 34. | 52.3 |
| D-4 | 0.75 | 78 | 0.769 | 87.3 | 43.0 | 44.3 |
| D-5 | 0.83 | 75 | 0.766 | 87.4 | 37.4 | 50.0 |

The dual-layered core of Sample D-2 (foam center and thermoset rubber outer core layer having a center diameter of 0.75 inches) was tested for hardness and the core was found to have a hardness gradient (across the entire core as measured at points in millimeters (mm) from the geometric center) in the range of about 32 Shore C to about 86 Shore C. The hardness of the core measured at the geometric center was about 32 Shore C and the hardness of the core measured at about 20 mm from the geometric center (that is, the surface of the outer core layer) was about 86 Shore C. The hardness values measured at various points along the core structure are described in Table 14 below and the hardness plot is shown in FIG. 5.

TABLE 14

Hardness Properties of Core Samples (C and D-2)

| Distance from Geometric Center of Core Sample (mm) | Hardness Gradient of Sample C (Shore C) | Hardness Gradient of Sample D-2 (Shore C) |
|---|---|---|
| 0 (Center) | 21 | 31.8 |
| 2 | 20.8 | 32.6 |
| 4 | 25 | 35.7 |
| 6 | 28.1 | 35.1 |
| 8 | 72 | 37.8 |
| 10 | 72.8 | 70.9 |
| 12 | 73.1 | 70.2 |
| 14 | 72.7 | 70.2 |
| 16 | 76.5 | 76.9 |
| 18 | 82.6 | 81.8 |
| 20 (Surface) | 88.9 | 86.4 |

In the following Examples, different foam formulations were used to prepare core samples using the above-described molding methods. The different formulations are described in Tables 15 and 16 below.

TABLE 15

(Sample E) (Comparative)

| Ingredient | Weight Percent |
|---|---|
| 4,4 Methylene Diphenyl Diisocyanate (MDI) | 17.26% |
| *Mondur ™ 582 (2.5 fn) polymeric methylene diphenyl diisocyanate (p-MDI) | 9.70% |
| Polyetratmethylene ether glycol (PTMEG 2000) | 42.26% |
| Poly THF ™ 650 molecular weight polyetratmethylene ether glycol (PTMEG) | 29.09% |
| Water | 0.45% |
| **Niax ™ L-1500 silicone-based surfactant | 0.98% |
| Garamite ™ 1958 mixed clay particulate | 0.00% |
| Dabco ™ 33LV tertiary amine catalys | 0.26% |

Figure 6:
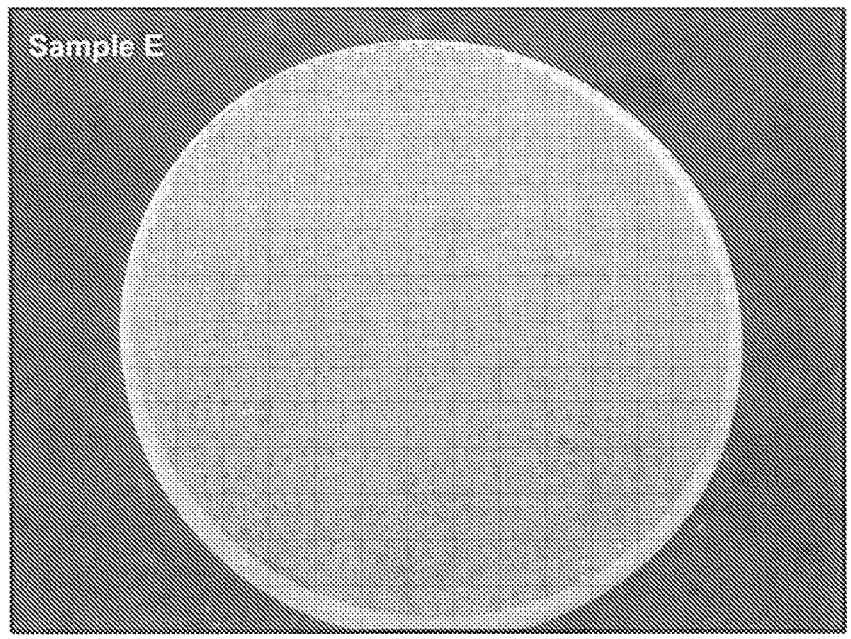
FIG. 6 is a photograph (top-view) showing the foam morphology of a polyurethane foam composition that does not contain clay particulate (Comparative Sample)

As shown in above Table 15, a polyurethane foam composition that did not contain any clay particulate, was used to prepare a spherical core (Sample E). The resulting core had relatively poor foam cell size and uniformity as shown in the photograph of FIG. 6. Some of the foam cells appeared to be relatively large and it is believed that gas would tend to diffuse out of some of the cells in this sample.

TABLE 16

Sample F

| Ingredient | Weight Percent |
|---|---|
| 4,4 Methylene Diphenyl Diisocyanate (MDI) | 17.06% |
| *Mondur ™ 582 (2.5 fn) polymeric methylene diphenyl diisocyanate (p-MDI) | 9.54% |
| Polyetratmethylene ether glycol (PTMEG 2000) | 42.21% |
| Poly THF ™ 650 molecular weight polyetratmethylene ether glycol (PTMEG) | 29.00% |
| Water | 0.45% |

TABLE 16-continued

Sample F

| Ingredient | Weight Percent |
|---|---|
| **Niax ™ L-1500 silicone-based surfactant | 0.99% |
| Garamite ™ 1958 nanoclay | 0.49% |
| Dabco ™ 33LV tertiary amine catalys | 0.26% |

Figure 7:
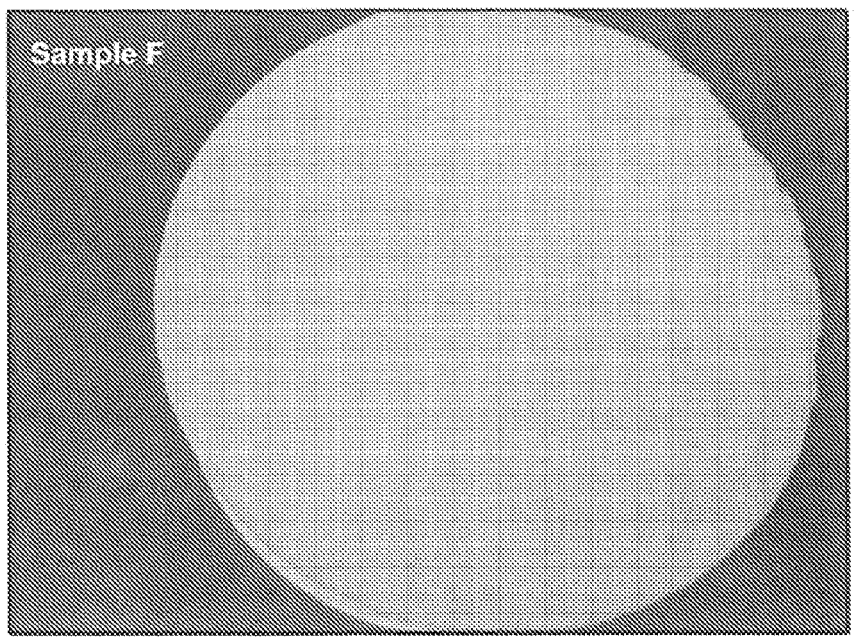
FIG. 7 is a photograph (top-view) showing the foam morphology of a polyurethane foam composition containing clay particulate in accordance with this invention.

As shown in above Table 16, a polyurethane foam composition, that contained nanoclay particulate, was used to prepare a spherical core (Sample F). The resulting core had relatively good foam cell size and uniformity as shown in the photograph of FIG. 7. Some of the foam cells in this sample appeared to be relatively small in size.

As discussed above, manufacturing the polyurethane foam generally involves two reactions: i) a "blowing" reaction, wherein an isocyanate group reacts with water to yield a thermally unstable carbamic acid that decomposes to give an amine, carbon dioxide, and heat; and ii) a "polymerization" reaction, wherein the isocyanate groups react with a polyol to generate urethane linkages.

Figure 8:
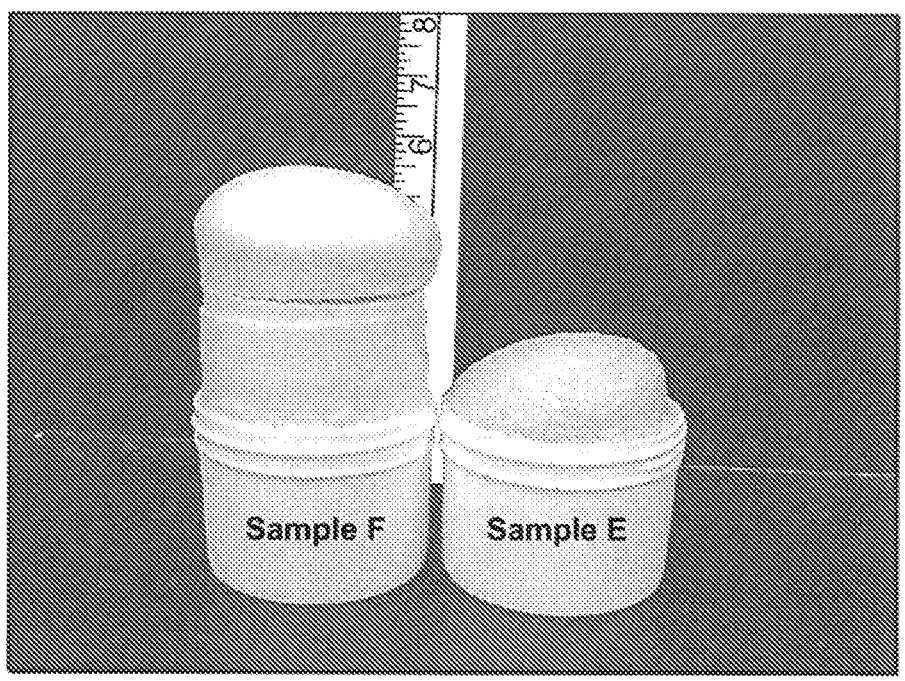
FIG. 8 is a photograph showing a column of a polyurethane foam composition containing clay particulate made in accordance with this invention (Sample F) versus a column of a polyurethane foam composition that does not contain any clay particulate (Sample E).

In general, both reactions occur when the reactants are combined and mixed together. Thus, it is important that the relative rates of reaction be balanced. The respective reaction rates should be controlled in order to produce a stable foam structure having good physical properties. If the blowing reaction takes place too fast relative to the polymerization reaction, the mixture will not have sufficient viscosity to build-up the internal polyurethane foam struts and the foam cells will coalesce and collapse on themselves. On the other hand, if the polymerization reaction occurs too quickly, it may lead to problems with cell growth, cell opening, and cell geometry. It is believed that adding the clay filler to the polyurethane or other composition in accordance with this invention helps regulate the relative rates of reaction so that foam cells will be generated and stabilized. The foam will rise uniformly and the internal struts, which connect the foam cells, will have enough strength to uphold the foam. When the foam stops rising, it will cure to form a hardened material having a foamed matrix. In FIG. 8, the polyurethane foam composition containing clay filler (above-described Sample F) is shown in a vertical position. The foam has risen completely and uniformly and has sufficient strength to maintain its stand-up position. In comparison, the foam composition that does not contain clay filler (above-described Sample E) also is shown. In Sample F, the foam has not risen to a sufficient height. The foam does not have sufficient strength and has collapsed on itself.

It is understood that the golf ball compositions, constructions, and products described and illustrated herein represent only some embodiments of the invention. It is appreciated by those skilled in the art that various changes and additions can be made to compositions, constructions, and products without departing from the spirit and scope of this invention. It is intended that all such embodiments be covered by the appended claims.

We claim:

1. A core assembly for a golf ball, comprising:
   i) an inner core layer comprising a foamed polyurethane composition, the inner core layer having a diameter in the range of about 0.100 to about 1.100 inches and a specific gravity ($SG_{inner}$), the foamed composition comprising mineral filler particulate in an amount of about 0.1 to about 9.0% by weight; and ii) an outer core layer comprising a non-foamed thermoset or thermoplastic material, the outer core layer being disposed about the inner core layer and having a thickness in the range of about 0.100 to about 0.750 inches and a specific gravity ($SG_{outer}$), wherein the $SG_{outer}$ is greater than the $SG_{inner}$.

2. The golf ball of claim 1, wherein the mineral filler particulate comprises clay particulate.

3. The golf ball of claim 2, wherein the clay particulate comprises a mixture of different clay particles, the particles having an average specific gravity in the range of about 1.30 to about 3.00 g/cc.

4. The golf ball of claim 2, wherein the clay particulate is nanoclay particulate.

5. The golf ball of claim 2, wherein the clay particulate has a chemically-modified surface, the surface being chemically-modified with a compound selected from the group consisting of ammonium compounds, protonated amines, organic phosphonium ions, and/or aminocarboxylic acids.

6. The golf ball of claim 5, wherein the surface of the clay particulate is chemically-modified with quaternary ammonium compound.

7. The golf ball of claim 1, wherein the outer core layer is a non-foamed thermoset material, the material comprising at least one thermoset rubber selected from the group consisting of polybutadiene, ethylene-propylene rubber, ethylene-propylene-diene rubber, polyisoprene, styrene-butadiene rubber, polyalkenamers, butyl rubber, halobutyl rubber, polystyrene elastomers, copolymers of isobutylene and p-alkylstyrene, halogenated copolymers of isobutylene and p-alkylstyrene, copolymers of butadiene with acrylonitrile, polychloroprene, alkyl acrylate rubber, chlorinated isoprene rubber, acrylonitrile chlorinated isoprene rubber, and mixtures thereof.

8. The golf ball of claim 7, wherein the outer core layer is polybutadiene rubber.

9. The golf ball of claim 1, wherein the outer core layer is a non-foamed thermoplastic material, the material comprising at least one thermoplastic polymer selected from the group consisting of partially-neutralized ionomers; highly-neutralized ionomers; polyesters; polyamides; polyamide-ethers, polyamide-esters; polyurethanes, polyureas; fluoropolymers; polystyrenes; polypropylenes; polyethylenes; polyvinyl chlorides; polyvinyl acetates; polycarbonates; polyvinyl alcohols; polyester-ethers; polyethers; polyimides, polyetherketones, polyamideimides; and mixtures thereof.

10. The golf ball of claim 9, wherein the thermoplastic material is a highly-neutralized ionomer composition comprising an E/X/Y-type copolymer, wherein E is ethylene, X is a $C_3$-$C_8$ α,β-ethylenically unsaturated carboxylic acid present in an amount of 10 to 20 wt. %, based on total weight of the copolymer, and Y is an acrylate selected from alkyl acrylates and aryl acrylates present in an amount of 0 to 50 wt. %, based on total weight of the copolymer, wherein greater than 70% of the acid groups present in the composition are neutralized with a metal ion.

11. The golf ball of claim 1, wherein the inner core layer has an outer surface hardness ($H_{inner\ core\ surface}$) and a center hardness ($H_{inner\ core\ center}$), the $H_{inner\ core\ surface}$ being greater than the $H_{inner\ core\ center}$ to provide a positive hardness gradient; and the outer core layer has an outer surface hardness ($H_{outer\ surface\ of\ OC}$) and an inner surface hardness ($H_{inner\ surface\ of\ OC}$), the $H_{outer\ surface\ of\ OC}$ being greater than the $H_{inner\ surface\ of\ OC}$ to provide a positive hardness gradient.

12. The golf ball of claim 11, wherein the $H_{inner\ core\ center}$ is in the range of about 20 Shore C to about 48 Shore C and the $H_{inner\ core\ surface}$ is in the range of about 24 Shore C to about 52 Shore C.

13. The golf ball of claim 11, wherein the $H_{inner\ surface\ of\ OC}$ is in the range of about 40 Shore C to about 87 Shore C and the $H_{outer\ surface\ of\ OC}$ is in the range of about 72 Shore C to about 95 Shore C.

14. The golf ball of claim 11, wherein the center hardness of the inner core ($H_{inner\ core\ center}$) is in the range of about 10 Shore C to about 60 Shore C and the outer surface hardness of the outer core layer ($H_{outer\ surface\ of\ OC}$) is in the range of about 65 Shore C to about 96 Shore C to provide a positive hardness gradient across the core assembly.

15. The golf ball of claim 1, wherein the inner core layer has an outer surface hardness ($H_{inner\ core\ surface}$) and a center hardness ($H_{inner\ core\ center}$), the $H_{inner\ core\ surface}$ being the same or less than the $H_{inner\ core\ center}$ to provide a zero or negative hardness gradient; and the outer core layer has an outer surface hardness ($H_{outer\ surface\ of\ OC}$) and an inner surface hardness ($H_{inner\ surface\ of\ OC}$), the $H_{outer\ surface\ of\ OC}$ being greater than the $H_{inner\ surface\ of\ OC}$ to provide a positive hardness gradient.

16. The golf ball of claim 15, wherein the $H_{inner\ core\ center}$ is in the range of about 15 Shore C to about 60 Shore C and the $H_{inner\ core\ surface}$ is in the range of about 10 Shore C to about 55 Shore C.

17. The golf ball of claim 15, wherein the $H_{inner\ surface\ of\ OC}$ is in the range of about 45 Shore C to about 85 Shore C and the $H_{outer\ surface\ of\ OC}$ is in the range of about 55 Shore C to about 95 Shore C.

18. The golf ball of claim 15, wherein the center hardness of the inner core ($H_{inner\ core\ center}$) is in the range of about 25 Shore C to about 65 Shore C and the outer surface hardness of the outer core layer ($H_{outer\ surface\ of\ OC}$) is in the range of about 40 Shore C to about 90 Shore C to provide a positive hardness gradient across the core assembly.

19. The golf ball of claim 1, wherein the inner core has a diameter in the range of about 0.100 to about 0.800 inches and specific gravity in the range of about 0.25 to about 1.25 g/cc.

20. The golf ball of claim 1, wherein the inner core has a diameter in the range of about 0.40 to about 0.60 inches and specific gravity in the range of about 0.30 to about 0.95 g/cc.

21. The golf ball of claim 1, wherein the outer core layer has a thickness in the range of about 0.250 to about 0.750 inches and specific gravity in the range of about 0.60 to about 2.90 g/cc.

22. A core assembly for a golf ball, comprising:
i) an inner core layer comprising a first foamed polyurethane composition, the inner core layer having a diameter in the range of about 0.100 to about 1.100 inches and a specific gravity ($SG_{inner}$), the foamed composition comprising mineral filler particulate in an amount of about 0.1 to about 9.0% by weight; and
ii) an outer core layer comprising a second foamed polyurethane composition, the outer core layer being disposed about the inner core layer and having a thickness in the range of about 0.100 to about 0.750 inches, and a specific gravity ($SG_{outer}$), wherein the $SG_{outer}$ is greater than the $SG_{inner}$.

23. The golf ball of claim 22, wherein the mineral filler particulate comprises clay particulate.

24. The golf ball of claim 23, wherein the clay particulate comprises a mixture of different clay particles, the particles having an average specific gravity in the range of about 1.30 to about 3.00 g/cc.

25. The golf ball of claim 23, wherein the clay particulate is nanoclay particulate.

26. The golf ball of claim 25, wherein the clay particulate has a chemically-modified surface, the surface being chemically-modified with a compound selected from the group consisting of ammonium compounds, protonated amines, organic phosphonium ions, and/or aminocarboxylic acids.

27. The golf ball of claim 26, wherein the surface of the clay particulate is chemically-modified with quaternary ammonium compound.

* * * * *